(12) United States Patent
Xue et al.

(10) Patent No.: US 11,690,074 B2
(45) Date of Patent: Jun. 27, 2023

(54) SIDELINK TRANSMISSION RESOURCE AGGREGATION FOR IN-COVERAGE NEW RADIO SIDELINK OPERATION

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 17/321,036

(22) Filed: May 14, 2021

(65) Prior Publication Data
US 2022/0369358 A1    Nov. 17, 2022

(51) Int. Cl.
*H04W 72/02* (2009.01)
*H04W 72/23* (2023.01)
*H04W 72/0446* (2023.01)
*H04W 72/20* (2023.01)

(52) U.S. Cl.
CPC ........... *H04W 72/23* (2023.01); *H04W 72/02* (2013.01); *H04W 72/0446* (2013.01); *H04W 72/20* (2023.01)

(58) Field of Classification Search
CPC . H04W 72/14; H04W 72/0406; H04W 72/02; H04W 72/0446
See application file for complete search history.

(56) References Cited

U.S. PATENT DOCUMENTS

2021/0037503 A1 *  2/2021  Nam ..................... H04W 72/02

FOREIGN PATENT DOCUMENTS

WO    WO-2020259329 A1     12/2020
WO    WO-2021060936 A1 *   4/2021  ........... H04L 1/0013

OTHER PUBLICATIONS

International Search Report and Written Opinion—PCT/US2022/071698—ISA/EPO—dated Jun. 24, 2022.

* cited by examiner

*Primary Examiner* — Brenda H Pham
(74) *Attorney, Agent, or Firm* — Norton Rose Fulbright LLP

(57) ABSTRACT

This disclosure provides systems, methods, and devices for wireless communication that support sidelink transmission resource aggregation for in-coverage new radio sidelink (NR SL) operations. In a first aspect, a method of wireless communication includes obtaining a sidelink aggregation factor identifying a number of sidelink resource slots available to a user equipment (UE) to add to each sidelink resource slot allocated in a grant of sidelink channel access from a serving base station. The UE may then receive a sidelink transmission grant identifying at least one granted sidelink resource slot, and determine an aggregated set of sidelink resource slots for each granted sidelink resource slot. The UE may then transmit sidelink communications using the aggregated set of sidelink resource slots for each granted sidelink resource slots used for the sidelink communications. Other aspects and features are also claimed and described.

30 Claims, 14 Drawing Sheets

SIDELINK TRANSMISSION RESOURCE AGGREGATION FOR IN-COVERAGE NEW RADIO SIDELINK OPERATION

TECHNICAL FIELD

Aspects of the present disclosure relate generally to wireless communication systems, and more particularly, to user equipment (UE)-to-UE sidelink communications in new radio (NR) communication systems. Some features may enable and provide improved communications, including sidelink transmission resource aggregation for in-coverage NR sidelink (SL) operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on the downlink and uplink transmissions.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes obtaining, by the UE, a sidelink aggregation factor identifying a number of sidelink resource slots available to the UE to add to each sidelink resource slot allocated to the UE in a grant of sidelink channel access from a serving base station, receiving, by the UE, a sidelink transmission grant from the serving base station identifying at least one granted sidelink resource slot, determining, by the UE, an aggregated set of sidelink resource slots for each granted sidelink resource slot of the at least one granted sidelink resource slot, wherein the aggregated set of sidelink resource slots includes a plurality of sidelink resource slots equal to a granted sidelink resource slot of the at least one granted sidelink resource slot plus a number of additional sidelink resource slots up to the sidelink aggregation factor, and transmitting, by the UE, sidelink communications using the aggregated set of sidelink resource slots for each one or more granted sidelink resource slots of the at least one granted sidelink resource slots used by the UE for the sidelink communications.

In an additional aspect of the disclosure, an apparatus configured for wireless communication is disclosed. The apparatus includes at least one processor, and a memory coupled to the at least one processor. The at least one processor is configured to obtain, by the UE, a sidelink aggregation factor identifying a number of sidelink resource slots available to the UE to add to each sidelink resource slot allocated to the UE in a grant of sidelink channel access from a serving base station, to receive, by the UE, a sidelink transmission grant from the serving base station identifying at least one granted sidelink resource slot, to determine, by the UE, an aggregated set of sidelink resource slots for each granted sidelink resource slot of the at least one granted sidelink resource slot, wherein the aggregated set of sidelink resource slots includes a plurality of sidelink resource slots equal to a granted sidelink resource slot of the at least one granted sidelink resource slot plus a number of additional sidelink resource slots up to the sidelink aggregation factor, and to transmit, by the UE, sidelink communications using the aggregated set of sidelink resource slots for each one or more granted sidelink resource slots of the at least one granted sidelink resource slots used by the UE for the sidelink communications.

In an additional aspect of the disclosure, an apparatus configured for wireless communication is disclosed. The apparatus includes means for obtaining, by the UE, a sidelink aggregation factor identifying a number of sidelink resource slots available to the UE to add to each resource slot allocated to the UE in a grant of sidelink channel access from a serving base station, means for receiving, by the UE, a sidelink transmission grant from the serving base station identifying at least one granted sidelink resource slot, means for determining, by the UE, an aggregated set of sidelink resource slots for each granted sidelink resource slot of the at least one granted sidelink resource slot, wherein the aggregated set of sidelink resource slots includes a plurality of sidelink resource slots equal to a granted sidelink resource slot of the at least one granted sidelink resource slot plus a number of additional sidelink resource slots up to the sidelink aggregation factor, and means for transmitting, by the UE, sidelink communications using the aggregated set of sidelink resource slots for each one or more granted sidelink resource slots of the at least one granted sidelink resource slots used by the UE for the sidelink communications.

In an additional aspect of the disclosure, a non-transitory computer-readable medium stores instructions that, when executed by a processor, cause the processor to perform operations including obtaining, by the UE, a sidelink aggregation factor identifying a number of sidelink resource slots available to the UE to add to each sidelink resource slot allocated to the UE in a grant of sidelink channel access from a serving base station, receiving, by the UE, a sidelink transmission grant from the serving base station identifying at least one granted sidelink resource slot, determining, by the UE, an aggregated set of sidelink resource slots for each granted sidelink resource slot of the at least one granted sidelink resource slot, wherein the aggregated set of sidelink resource slots includes a plurality of sidelink resource slots equal to a granted sidelink resource slot of the at least one granted sidelink resource slot plus a number of additional sidelink resource slots up to the sidelink aggregation factor, and transmitting, by the UE, sidelink communications using the aggregated set of sidelink resource slots for each one or more granted sidelink resource slots of the at least one granted sidelink resource slots used by the UE for the sidelink communications.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
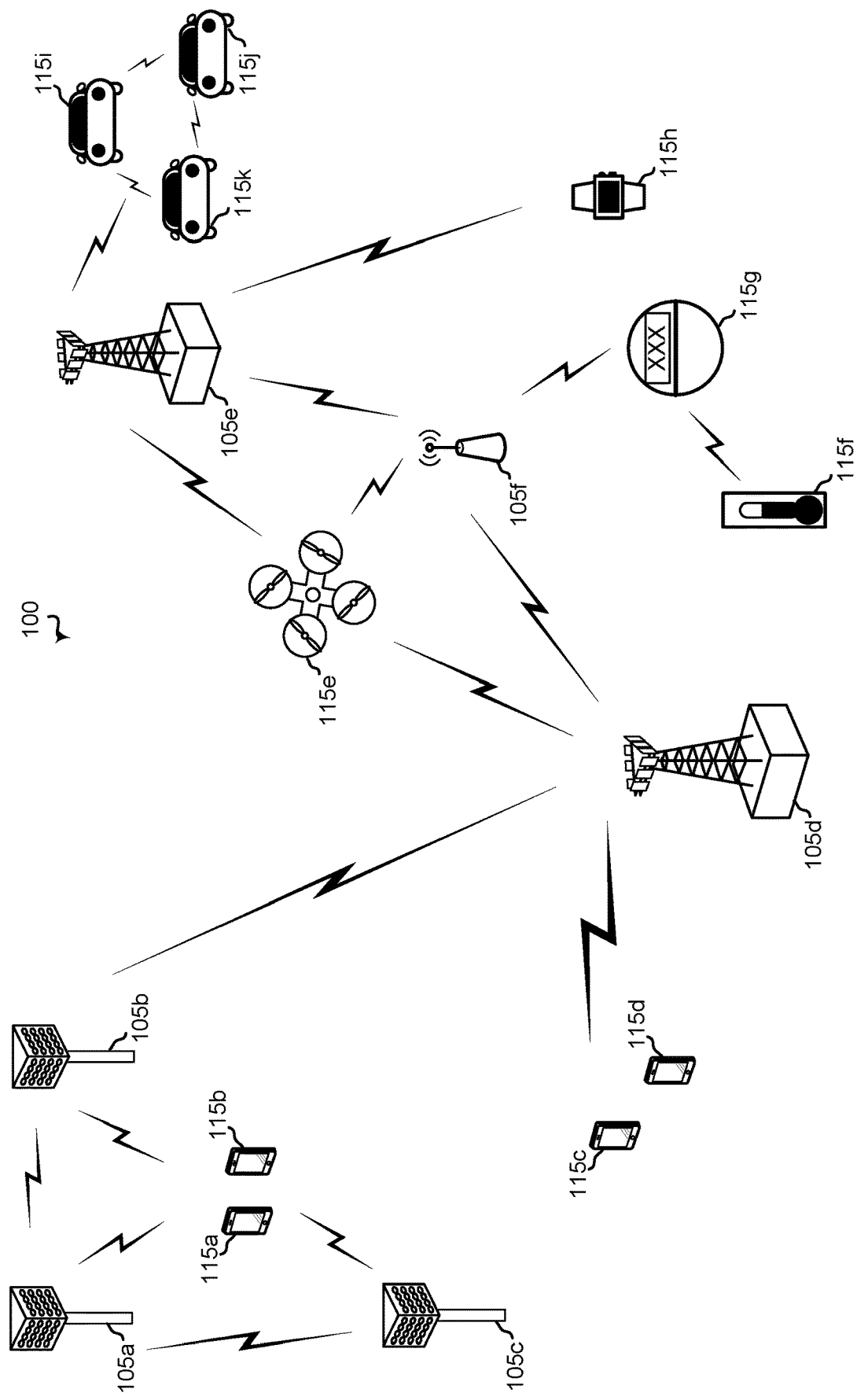
FIG. 1 is a block diagram illustrating example details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support sidelink transmission resource aggregation for in-coverage new radio sidelink (NR SL) operations. Particular implementations of the subject matter described in this disclosure may be implemented to realize one or more of the following potential advantages or benefits. In some aspects, the aspects of the present disclosure that provides for supports sidelink transmission resource aggregation for in-coverage NR SL operations using a sidelink aggregation factor, such aggregation factor may be communicated by the serving base station either as a new parameter in a DCI message, which could be defined in new standards for DCI formatting, or as a part of higher layer signaling, such as RRC signaling, which may maintain backward compatibility with existing DCI formats.

It should further be noted that the aspects including sidelink aggregation can be used for beamforming alignment between a pair of peer sidelink UEs operating in-coverage of NR SL operations, referred to as operating in "Mode 1." The configured grant solution may grant a series of sidelink resource slots that can be used for beam sweeping transmissions to initiate beamforming alignment without considerable control transmission overhead. Thus, sidelink resource aggregation according to aspects of the present disclosure may allow for beamforming alignment that can be more flexibly arranged via a dynamic grant.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3 GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
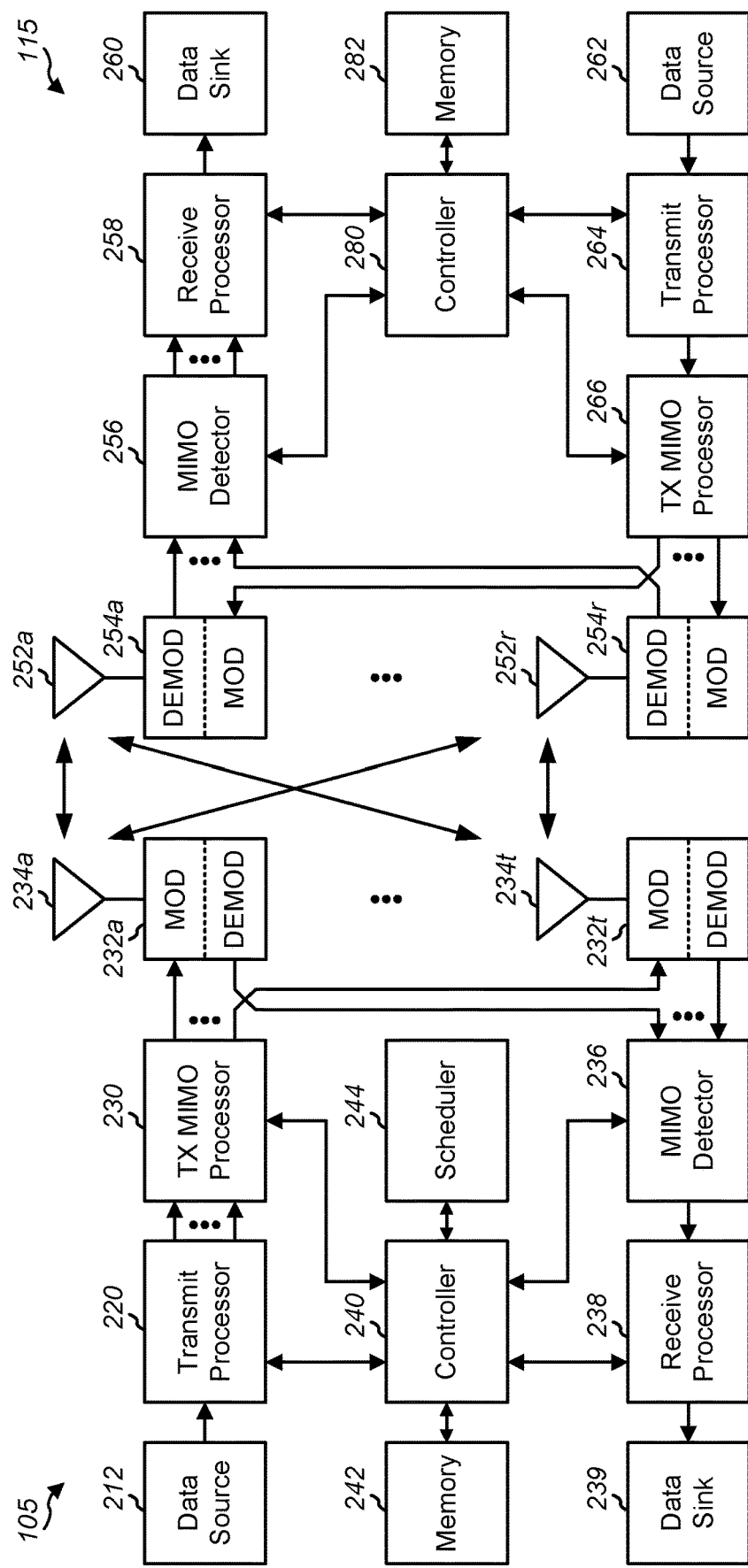
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 4, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-µs, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-μs slots, may also be referred to as a "Type 1 LBT." An abbreviated LBT procedure, such as a CAT 2 LBT procedure, which may include a one-shot CCA for 16-μs or 25-μs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

New radio (NR) sidelink (SL) operations were at one time in 3GPP Release 16 (Rel-16) for the vehicle-to-everything (V2X) use case. This V2X use of NR SL was discussed to increase safety via peer-to-peer delivery of safety messages over intelligent transportation service (ITS) and other sub-6 GHz licensed bands. Such use would include a dynamic network topology frequently dominated by groupcast and broadcast traffic. Two resource allocation/channel access modes have been specified: a first mode (Mode 1), which was developed for in-coverage deployment, and a second mode (Mode 2), which was developed for out-of-coverage deployment. "In-coverage" may refer to an approach where a transmitting UE receives a grant from a serving base station for sidelink channel access, while "out-of-coverage" may refer to an approach where a sidelink UE may use autonomous sensing for channel access shared by nodes that may not be in the same operator service or radio access technology.

In Mode 1 operation, the base station can issue a downlink control information (DCI) message that includes a dynamic grant (DG) of a portion of radio resources for up to a predetermined maximum number of grantable resources. Currently, a DCI message may include a dynamic grant of a maximum of three sidelink transmission resources (e.g., physical sidelink shared channel (PSSCH) resources). Such a DCI may include a hybrid automatic receipt request (HARM) process identifier (ID) as a reference index to the granted sidelink resources. The DCI message can also assign an uplink control transmission resource (e.g., physical uplink control channel (PUCCH)) that may be used by the sidelink transmitting UE to request additional retransmission resources.

Figure 3:
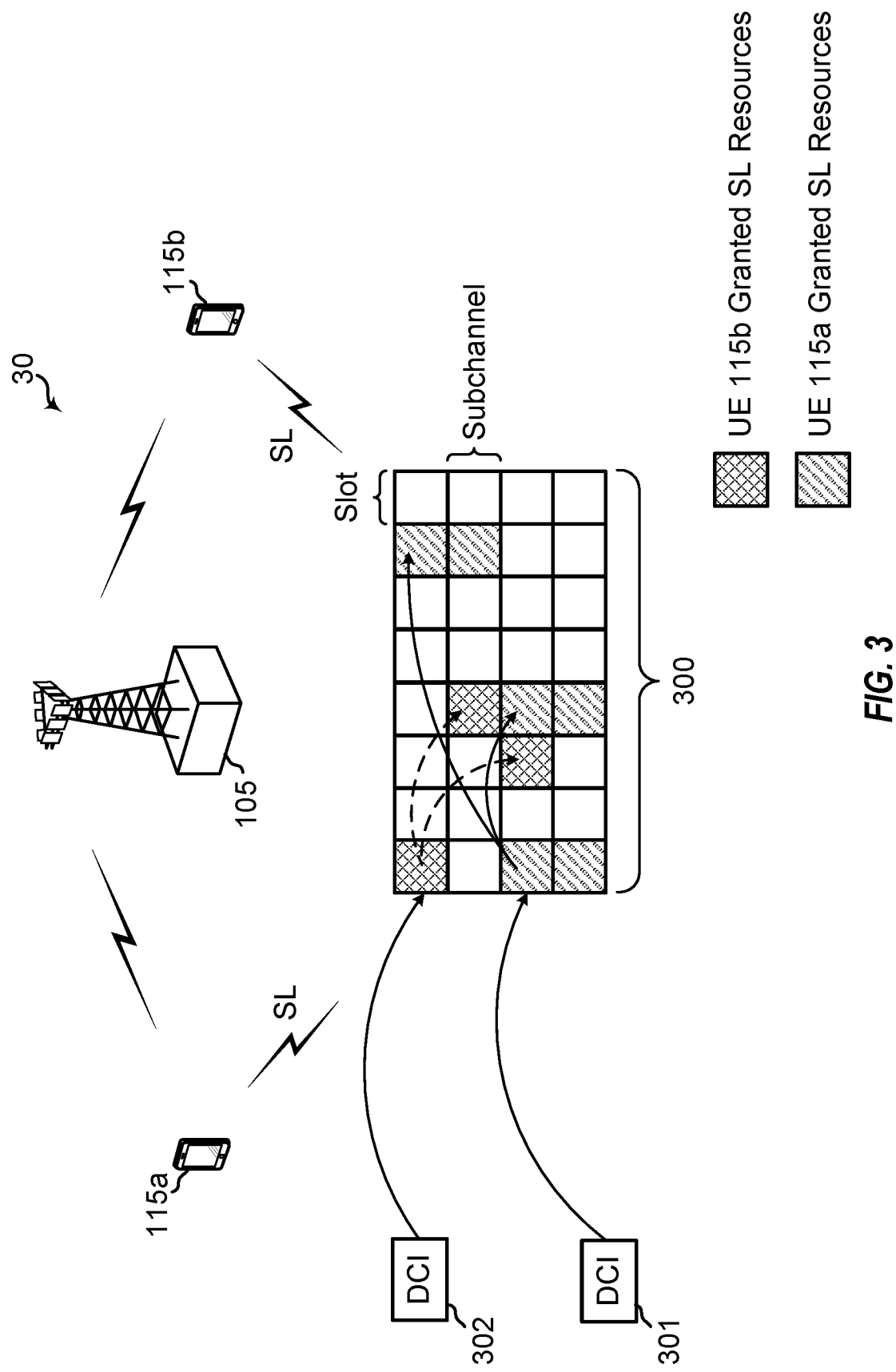
FIG. 3 is a block diagram illustrating a wireless network configured for Mode 1 NR SL operations with UEs served by a base station.

FIG. 3 is a block diagram illustrating a wireless network 30 configured for Mode 1 NR SL operations with UEs 115a and 115b served by base station 105. UEs 115a and 115b may be configured by base station 105 for sidelink communications with a pool of available sidelink transmission resources, transmission resource pool 300. Transmission resource pool 300 includes a number of slots and sub-channels configured and available for use by UEs 115a and 115b for sidelink communications within a Mode 1 operation. Base station 105 may transmit DCI message 301 to UE 115a and DCI message 302 to UE 115b, which includes sidelink transmission grants. Currently, a DCI message, such as DCI messages 301 and 302 may include a grant of up to three separate resources. As illustrated, the sidelink transmission grant of DCI message 301 includes a grant of three resource slots with a two sub-channels bandwidth, while DCI message 302 includes a grant of three resource slots with a single sub-channel bandwidth. UE 115a may use the granted three resources of DCI message 301 for sidelink communications, and UE 115b may use the granted three resources of DCI message 302 for sidelink communications.

In order to address the potential of half-duplex deafness, the sidelink resources are granted at non-contiguous slots, as shown in FIG. 3. Half-duplex deafness may occur when two transmission-reception points (TRPs), such as UE 115a and 115b transmit at the same time to each other, but because each TRP is transmitting, they cannot receive the transmission. By granting sidelink resources in non-contiguous slots, the network may avoid the occurrence of half-duplex deafness between sidelink communicating TRPs, such as UE 115a and 115b. The non-contiguously granted slots may also allow UEs 115a or 115b to collect feedback (e.g., physical sidelink feedback channel (PSFCH) feedback) before the next transmission occasion at the next granted sidelink resource slot. For example, if the next sidelink transmission opportunity were for a retransmission, feedback confirming receipt of the scheduled retransmission may prompt the sidelink TRP to terminate the scheduled communication.

While originally suggested for V2X use cases, NR SL operations have been discussed for use in other vertical domains (e.g., 3GPP Release 17 (Rel-17)). However, not every vertical domain may have access to the sub-6 GHz licensed band. Vertical domains with access to sub-6 GHz licensed band may also seek opportunities in unlicensed or shared spectrum for a more economical or wider potential data pipe. Under current operation, there is approximately 1.8 GHz of bandwidth available in 5G/6 GHz unlicensed band, and approximately 7 GHz of bandwidth in the 60 GHz unlicensed band. Because of the wide potential availability between sub-6 GHz and millimeter Wave (mmW) spectrum, there may be more diverse deployment scenarios and use cases than what may have been currently discussed in 3GPP Rel-16 and Rel-17 operations.

According to the various aspects of the present disclosure that provide sidelink transmission resource aggregation for in-coverage NR SL operations, a new dynamic grant mechanism may be defined for use cases where there is less concern of half-duplex deafness, such as, in one example implementation, for traffic dominated by unicast or pre-organized groupcast, yet more concern for control signaling capacity and overhead. DCI format 3_0, as defined in 3GPP Rel-16, has a limited capacity for granting resources to a power-limited UE that can occupy limited sub-channels per slot. This may result is difficulties supporting a large number of sidelink UEs. There have been suggested solutions that make more bits available from DCI format 3_0, such as with advanced beam management in the higher frequency bands (e.g., ~60 GHz). Accordingly, a mechanism that can grant more sidelink resources when needed with little or no additional bits in the DCI message may be beneficial.

Aspects of the present disclosure that provide sidelink transmission resource aggregation for in-coverage NR SL operations introduce sidelink transmission resource aggregation in Mode 1 resource allocation. According to the various aspects, a sidelink UE can be configured with a sidelink aggregation factor. Certain aspects of the present disclosure may provide for such sidelink aggregation factor to be communicated in higher layer signaling, such as in layer 3 radio resource control (RRC) signaling, while other aspects may include additional bits in the lower layer signaling, such as in layer 1 signaling (e.g., the DCI messaging). With the sidelink aggregation factor, the sidelink UE may interpret the non-contiguous sidelink resource grants as the leading slots of up to a maximum number of grantable aggregated slots.

Figure 4:
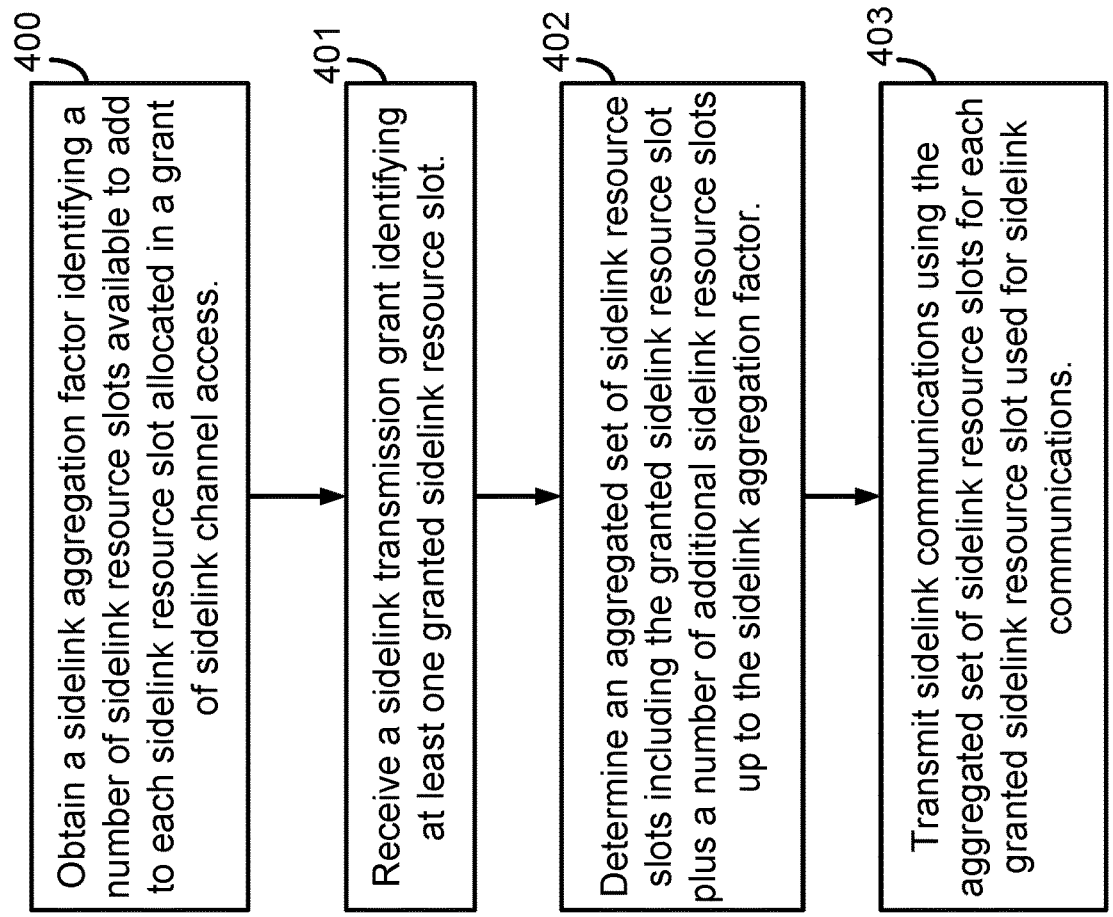
FIG. 4 is a block diagram illustrating example blocks executed to implement sidelink transmission resource aggregation for in-coverage new radio sidelink (NR SL) operations according to one or more aspects.
Figure 13:
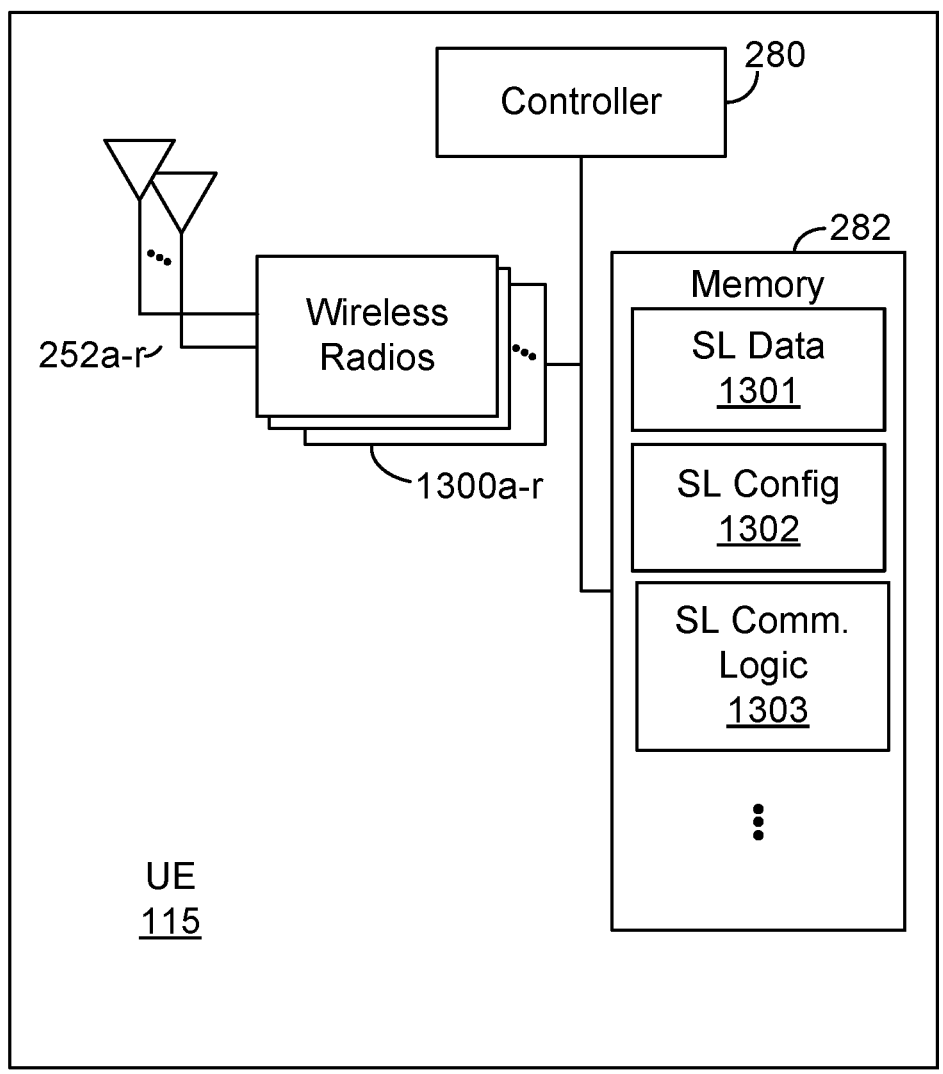
FIG. 13 is a block diagram illustrating an example UE that supports sidelink transmission resource aggregation for in-coverage NR SL operations according to one or more aspects of the present disclosure.

FIG. 4 is a flow diagram illustrating an example process 400 that supports sidelink transmission resource aggregation for in-coverage new radio sidelink (NR SL) operations according to one or more aspects. Example operations (also referred to as "blocks") may enable UE 115 to support sidelink transmission resource aggregation for in-coverage NR SL operations. The example blocks will also be described with respect to UE 115 as illustrated in FIGS. 2 and 13. FIG. 13 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1300a-r and antennas 252a-r. Wireless radios 1300a-r includes various components and hardware, as illustrated in FIG. 2 for UE 115, including modulator/demodulators 254a-r, MIMO detector 256, receive processor 258, transmit processor 264, and TX MIMO processor 266

At block 400, a UE obtains a sidelink aggregation factor identifying a number of sidelink resource slots available to the UE to add to each sidelink resource slot allocated to the UE in a grant of sidelink channel access from a serving base station. An NR SL UE with sidelink communication capabilities, such as UE 115, may have sidelink configuration information stored in memory 282, such as at sidelink configuration 1302. UE 115 may receive configuration of a transmission resource pool of available resources for sidelink communications. UE 115 may receive such configuration information from a serving base station via antennas 252a-r and wireless radios 1300a-r, which may then be stored at sidelink configuration 1302 in memory 282. According to the various aspects of the present disclosure, UE 115 may further obtain a sidelink aggregation factor, which defines a number of sidelink resources UE 115 may add to a granted sidelink resource. This sidelink aggregation factor may be received from the serving base station, via antennas 252a-4 and wireless radios 1300a-r, in higher layer signaling, such as RRC signaling, or in more dynamic, or lower layer signaling, such as DCI or MAC CE signaling, and stored at sidelink configuration 1302 in memory 282.

At block 401, the UE receives a sidelink transmission grant from the serving base station identifying at least one granted sidelink resource slot. In operating in Mode 1, UE 115 will receive a sidelink transmission grant in a DCI from the serving base station via antennas 252a-r and wireless radios 1300a-r. The sidelink transmission grant may grant up to a predetermined maximum number of grantable resources for UE 115 to use for sidelink communications.

At block 402, the UE determines an aggregated set of sidelink resource slots for each granted sidelink resource slot of the at least one granted sidelink resource slot, wherein the aggregated set of sidelink resource slots includes a plurality of sidelink resource slots equal to a granted sidelink resource slot of the at least one granted sidelink resource slot plus a number of additional sidelink resource slots up to the sidelink aggregation factor. In order to perform sidelink communications, UE 115, under control of controller/processor 280, executes sidelink communication logic 1303, stored in memory 282. The functionality and features enabled by controller/processor 280 executing the instructions and code of sidelink communication logic 1303 (referred to herein as the "execution environment" of sidelink communication logic 1303) provide UE 115 with the capability to conduct sidelink communications. With data available for sidelink transmission in sidelink data 1301 in memory 282, UE 115 initiates sidelink communications, within the execution environment of sidelink communication logic 1303, using the granted sidelink resource slots aggregated with a number of additional sidelink resource slots up to the number indicated in the sidelink aggregation factor. In determining how many additional resource slots to add, UE 115, within the execution environment of sidelink communication logic 1303, ensures that the aggregated slots do not overlap with any additional granted sidelink resources or does not overlap with any minimum spacing determined by the network to be preserved between communications.

At block 403, the UE transmits sidelink communications using the aggregated set of sidelink resource slots for each one or more granted sidelink resource slots of the at least one granted sidelink resource slots used by the UE for the sidelink communications. Once UE 115 determines the set of aggregated sidelink resource slots including the granted sidelink slot and any additional sidelink slots used according to the sidelink aggregation factor, it may then transmit the data from sidelink data 1301 to the target UE or UEs via wireless radios 1300a-r and antennas 252a-r using sidelink communications.

In some implementations, the aggregated sidelink slots may be contiguous with the granted sidelink slot and with each other. In additional implementations, the aggregated sidelink slots may be non-contiguous with the granted sidelink slot and with each other.

In some implementations, the sidelink aggregation factor may be applicable according to a specified indication. For example, the UE, such as UE 115 may apply the sidelink aggregation factor on a per transmission resource pool basis, or perhaps to a certain time and frequency window within a resource pool, or based on a dynamic indication that toggles the application on or off. Further, UE 115 may apply the sidelink aggregation factor to a particular set of target devices.

In some additional implementations, the UE, such as UE 115 may transmit one or multiple transport blocks per sidelink transmission grant. An indication may be received by UE 115 that indicates whether one or more transport blocks are to be transmitted in the grant.

As noted above, the aspects of the present disclosure that provides for supports sidelink transmission resource aggregation for in-coverage NR SL operations using a sidelink aggregation factor, such aggregation factor may be communicated by the serving base station either as a new parameter in a DCI message, which could be defined in new standards for DCI formatting, or as a part of higher layer signaling, such as RRC signaling, which may maintain backward compatibility with existing DCI formats.

It should further be noted that the aspects including sidelink aggregation can be used for beamforming alignment between a pair of peer sidelink UEs operating in Mode 1. The configured grant solution may grant a series of sidelink resource slots that can be used for beam sweeping transmissions to initiate beamforming alignment without considerable control transmission overhead. Thus, sidelink resource aggregation according to aspects of the present disclosure may allow for beamforming alignment that can be more flexibly arranged via a dynamic grant.

Figure 5:
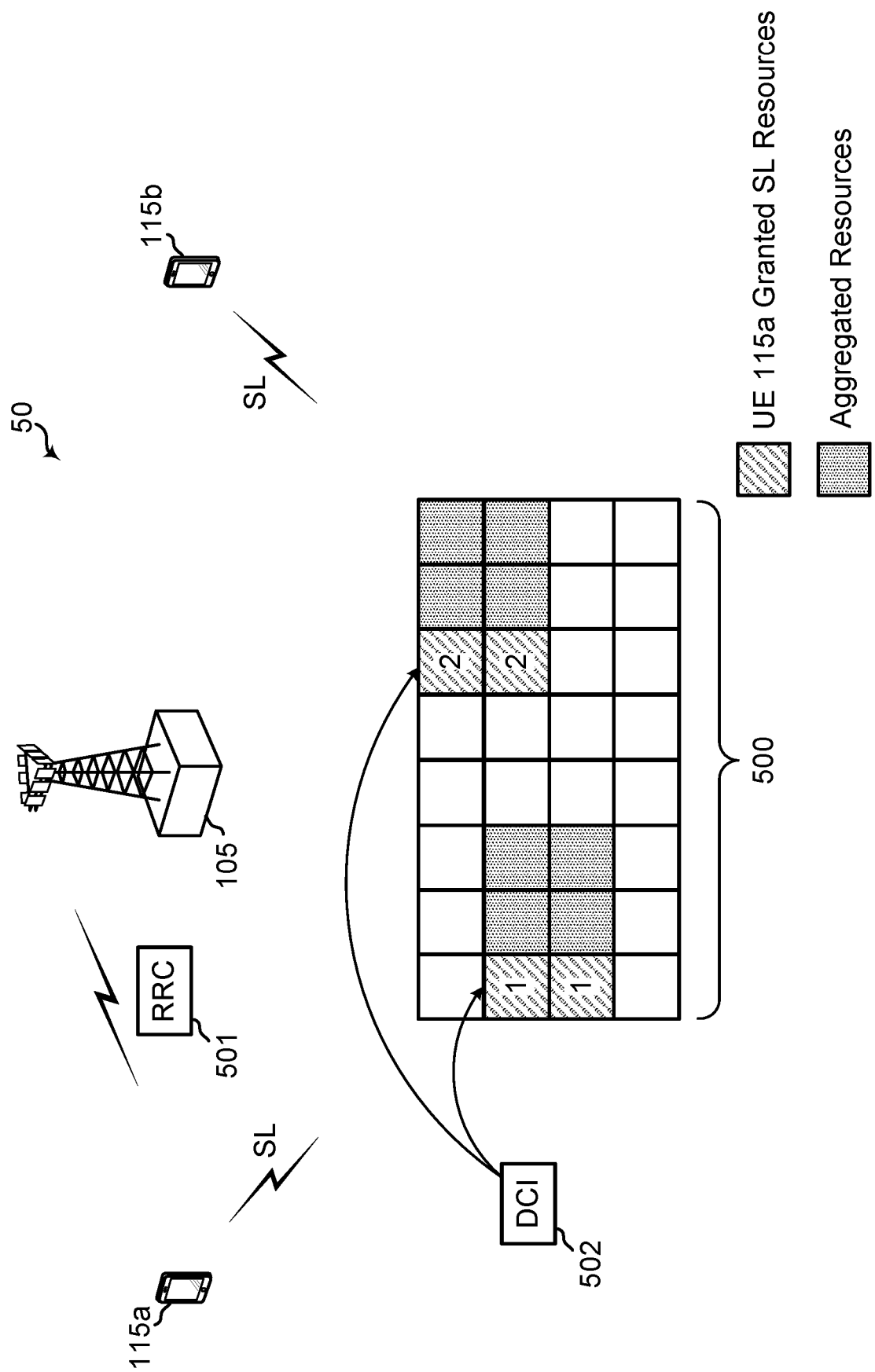
FIG. 5 is a block diagram illustrating a wireless network configured for Mode 1 NR SL operations with UEs served by a base station and that supports sidelink transmission resource aggregation for in-coverage NR SL operations according to one or more aspects.

FIG. 5 is a block diagram illustrating a wireless network 50 configured for Mode 1 NR SL operations with UEs 115*a* and 115*b* served by base station 105 and that supports sidelink transmission resource aggregation for in-coverage NR SL operations according to one or more aspects. Base station 105 configures UE 115*a* via RRC signaling 501 with transmission resource pool 500 available for sidelink communications by UE 115*a* with, for example, UE 115*b*. When operating in Mode 1 according to the illustrated aspect, an NR SL UE, such as UE 115*a*, may also receive a sidelink aggregation factor (denoted as R) in RRC signaling 501. By default, the aggregation factor may equal one (R=1). However, according to the illustrated aspect, sidelink aggregation factor equals three (R=3). Base station 105 may then transmit a sidelink transmission grant through DCI message 502, such as, for example, a DCI format 3_0 message. The sidelink transmission grant of DCI message 502 grants two two-sub-channel slots, slots 1 and 2, for sidelink transmission. UE 115*a* may interpret this sidelink transmission grant as granting an aggregated set of sidelink resource slots within transmission resource pool 500 including the granted sidelink resource slots (slots 1-2) identified in DCI message 502 supplemented by a number of additional two-sub-channel slots corresponding to the sidelink aggregation factor, R, which in the illustrated aspect is three. The resulting resource allocation with the sidelink aggregation factor grants UE 115*a* a total of 12 sub-channels over two granted two-subchannel slots, slots 1-2.

It should be noted that while the aggregated resources are illustrated in FIG. 5 as contiguous sidelink resource slots with the corresponding granted sidelink resource slot, additional or alternative aspects may provide for the aggregated resources to be non-contiguous.

Figure 6:
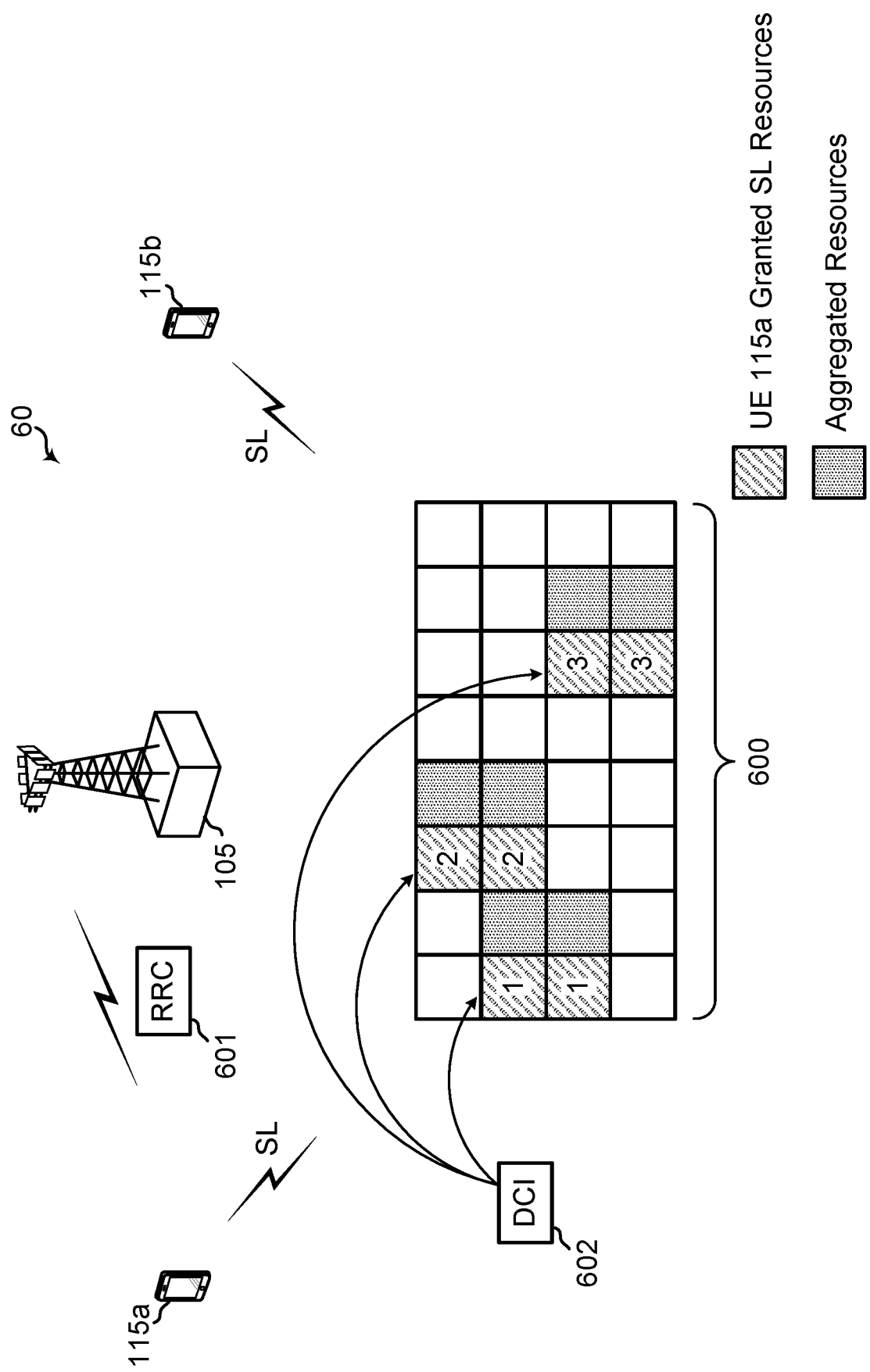
FIG. 6 is a block diagram illustrating a wireless network configured for Mode 1 NR SL operations with UEs served by a base station and that supports sidelink transmission resource aggregation for in-coverage NR SL operations according to one or more aspects.

FIG. 6 is a block diagram illustrating a wireless network 60 configured for Mode 1 NR SL operations with UEs 115*a* and 115*b* served by base station 105 and that supports sidelink transmission resource aggregation for in-coverage NR SL operations according to one or more aspects. Base station 105 configures UE 115*a* via RRC signaling 601 with transmission resource pool 600 available for sidelink communications by UE 115*a* with, for example, UE 115*b*. UE 115*a*, operating in Mode 1, may also receive a sidelink aggregation factor (denoted as R), which, in the illustrated example, is three. The sidelink aggregation factor may be received in RRC signaling 601 or in DCI message 602 along with a sidelink transmission grant. As noted above, a sidelink transmission grant may grant up to a predetermined maximum number of grantable resources within transmission resource pool 600. That predetermined maximum number may be established through wireless standards or may be established by a network operator or the network location. The sidelink transmission grant included in DCI message 602 grants three two-sub-channel sidelink resource slots (slots 1-3).

The sidelink aggregation factor configured for UE 115*a*, three, would result in an overlap of resources with the granted resource slot, slot 2. In such a circumstance, UE 115*a* would reduce the implementation of the aggregated resources to avoid any such overlap. Thus, even though UE 115*a* is configured to aggregate three slots to granted sidelink slots, slots 1-3, UE 115*a* implements the aggregated slots according to a sidelink aggregation factor of two.

In additional or alternative implementations, the network may further configure UE 115*a* with a parameter that provides the minimum distance between a last aggregated slot and a next granted sidelink slot. In such implementations, UE 115*a* may reduce the implemented sidelink aggregation factor where the use of the full configured factor would overlap into that minimum distance defined by the configured parameter. Therefore, UE 115*a* may determine to aggregate additional slots up to the number configured for the sidelink aggregation factor based on other criteria, such as the location of the next granted sidelink slot, a network-defined parameter, or even where the UE, such as UE 115*a*, does not have sufficient sideline data to occupy the entire configured set of aggregated resources.

Figure 7:
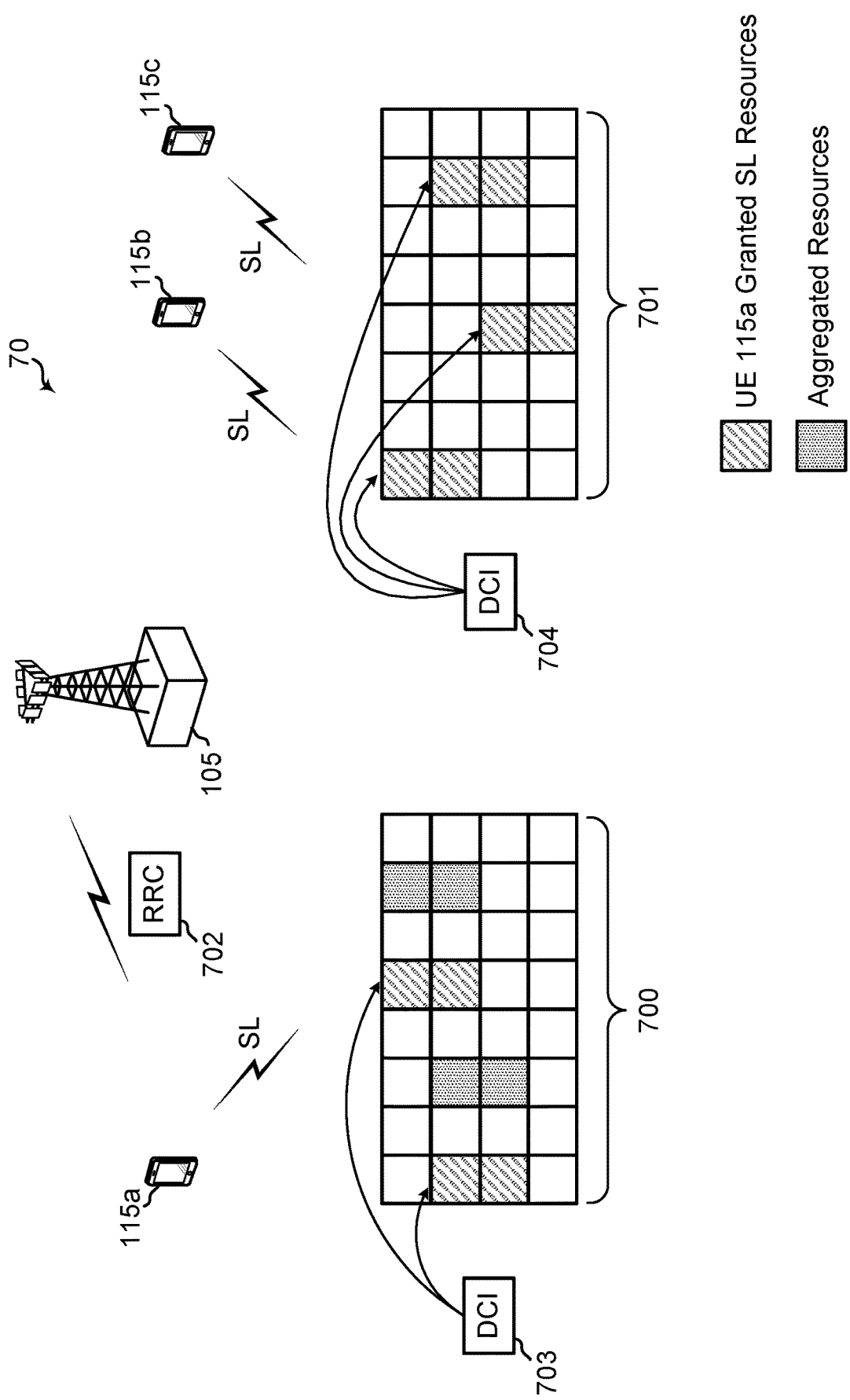
FIG. 7 is a block diagram illustrating a wireless network configured for Mode 1 NR SL operations with UEs served by a base station and that supports sidelink transmission resource aggregation for in-coverage NR SL operations according to one or more aspects.

FIG. 7 is a block diagram illustrating a wireless network 70 configured for Mode 1 NR SL operations with UEs 115*a*-115*c* served by base station 105 and that supports sidelink transmission resource aggregation for in-coverage NR SL operations according to one or more aspects. Base station 105 configures UE 115*a* via RRC signaling 702 with transmission resource pools 700 and 701 available for sidelink communications by UE 115*a* with, for example, UE 115*b*. UE 115*a*, operating in Mode 1, may also receive a sidelink aggregation factor (denoted as R) via RRC signaling 702, which, in the illustrated example, is two. According to the illustrated example, the sidelink aggregation factor may be associated with various other factors, such as on a per transmission resource pool basis, a pre-specified set of destinations, in response to a dynamic indication, or the like.

In a first example implementation, RRC signaling 702 may further indicate that the sidelink aggregation factor may apply to transmission resource pool 700. Therefore, upon receiving the sidelink transmission grant in DCI message 703, UE 115*a* interprets the grant as the granted sidelink resource plus the aggregated resources according to the sidelink aggregation factor. When UE 115*a* receives the next sidelink transmission grant in DCI message 704, no aggregated slots are included with the granted sidelink resource slots in transmission resource pool 701, as UE 115*a* was configured to apply the aggregation factor to transmission resource pool 700.

As illustrated in transmission resource pool 700, non-contiguous resource slots have been used. UE 115*a* may further be configured, via RRC signaling 702, to conduct sidelink resource aggregation with a fixed, non-zero interval between the granted sidelink resource slot and the aggregated sidelink resource slots. The interval can be defined to accommodate UE processing delay, in order to receive and process feedback, such as by receiving acknowledgement information on PSFCH.

In a second example implementation, RRC signaling 702 further configures UE 115a to apply the sidelink aggregation factor to sidelink communications with UE 115c. Therefore, when UE 115a receives DCI message 703 with a sidelink transmission grant, UE 115a may use the aggregated resources to create the set of aggregated sidelink resource slots for sidelink communications with UE 115c. If UE 115a has sidelink data for UE 115b, it would restrict use to the granted sidelink resource slots for those sidelink communications.

In a third example implementation, the application of the sidelink transmission factor may be controlled using a dynamic indication. Thus, when UE 115a receives DCI message 703, it includes a dynamic indication that triggers UE 115a to use the sidelink aggregation factor to add the additional sidelink resource slots to the granted sidelink resource slots in the sidelink transmission grant of DCI message 703. UE 115a may then receive DCI message 704, in which the dynamic indication triggers a deactivation of the sidelink resource activation.

Figure 8:
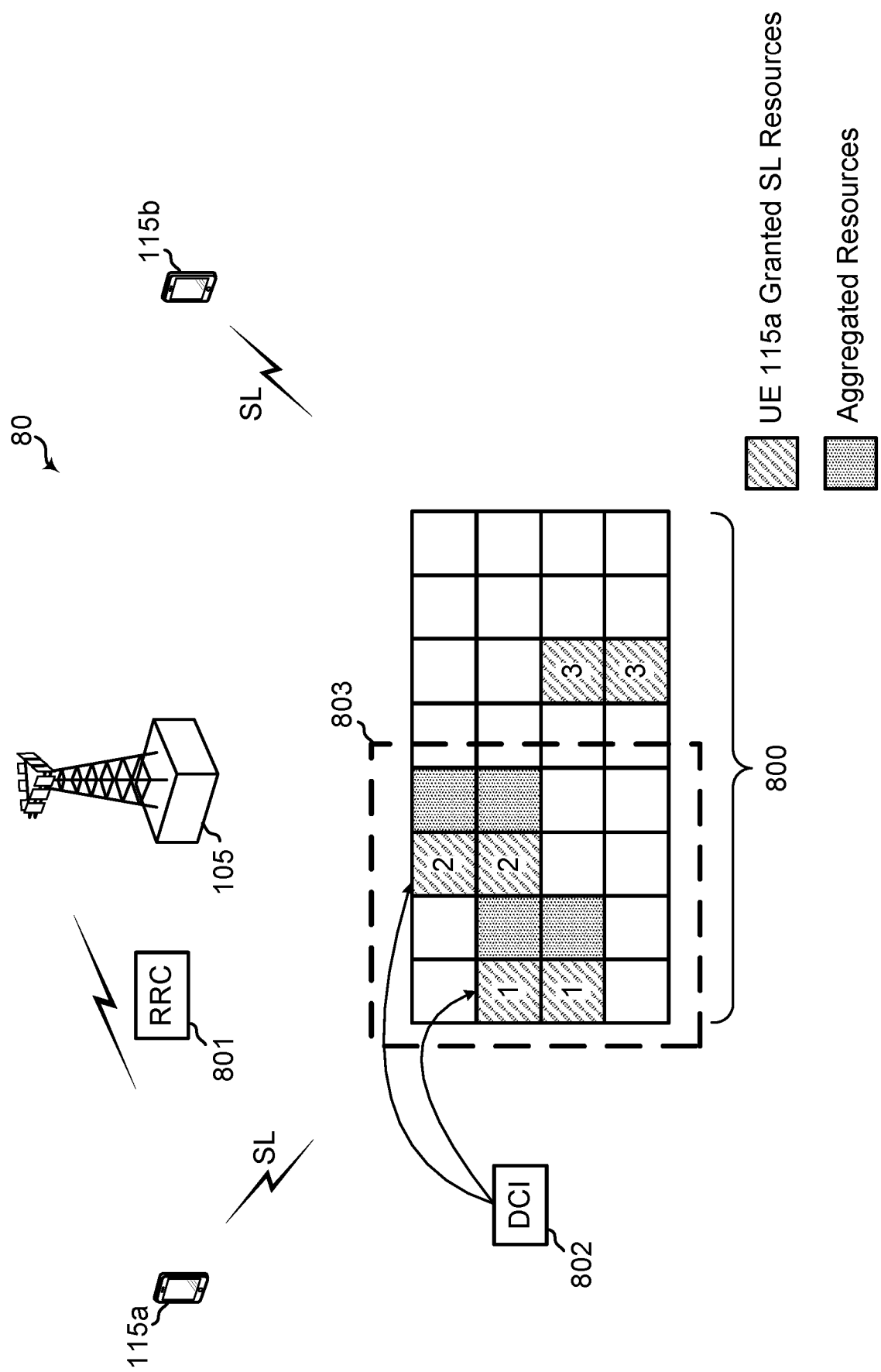
FIG. 8 is a block diagram illustrating a wireless network configured for Mode 1 NR SL operations with UEs served by a base station and that supports sidelink transmission resource aggregation for in-coverage NR SL operations according to one or more aspects.

FIG. 8 is a block diagram illustrating a wireless network 80 configured for Mode 1 NR SL operations with UEs 115a and 115b served by base station 105 and that supports sidelink transmission resource aggregation for in-coverage NR SL operations according to one or more aspects. Base station 105 configures UE 115a via RRC signaling 801 with transmission resource pool 800 available for sidelink communications by UE 115a with, for example, UE 115b. UE 115a, operating in Mode 1, may also receive a sidelink aggregation factor (denoted as R) via RRC signaling 801, which, in the illustrated example, is two. According to the illustrated example, as in the example aspects illustrated in FIG. 7, the sidelink aggregation factor illustrated in FIG. 8 may be associated with another factor, such as a predefined time and frequency window 803. Thus, when UE 115a receives the sidelink transmission grant in DCI message 802, it will apply the aggregated resources, based on the sidelink aggregation factor, to the granted sidelink resource slots within predefined time and frequency window 803. Outside of predefined time and frequency window 803, UE 115a will perform its sidelink communications using the granted sidelink resources.

The sidelink communications, which may include either sidelink transmissions or sidelink retransmissions, may be configured for maximum throughput, for maximum reliability, or for somewhere in between. In order to control the transmissions between throughput and reliability, the sidelink aggregation operation may be configured to use the sidelink transmission grant for a single transport block, for multiple transport blocks, but fewer than the predetermined maximum number of grantable sidelink resources, or for the number of transport blocks equal to that predetermined maximum number of grantable sidelink resources. Referring back to FIG. 6, as a baseline transmission option, UE 115a can be configured to use the set of aggregated sidelink resources, including the granted sidelink resource slot and any aggregated resources slots for transmission of the same transport block. Thus, UE 115a may use the first granted sidelink resource slot for transmission of the single transport block and use, where necessary, the remaining aggregated resource slots for retransmission of the single transport block. This configuration of the granted and aggregated resources for a single transport block maximizes the reliability of transmission using the same control overhead and without compromising the mitigating effect on half-duplex deafness.

UE 115a can be configured with an uplink control signal opportunity (e.g., PUCCH), which may be anchored at the last sidelink transmission resource slot of the set of granted and aggregated sidelink transmission resource slots to send acknowledgements (ACK/NACK) or request additional resources for retransmission.

It should be noted that, when operating in mmW frequency bands, UE 115a may determine how reservations are made in sidelink control information (SCI) messages for retransmission resources. Reservation of resources in Mode 1 operations may be developed or maintained for potential co-existence with other nodes operating in Mode 2.

As an alternative transmission option to the single transport block transmission configuration, UE 115a can be configured to interpret the sidelink transmission grant of DCI message 602 for transmission of a number of transport blocks up to the predetermined maximum number of grantable resources, with up to (R−1) resources for retransmission of each transport block carried by the aggregated resources. For example, if the predetermined maximum number of grantable resources is three, then up to three transport blocks may be carried by three hybrid automatic receipt request (HARQ) processes with incremental identifiers (IDs). The indication of HARQ process ID included in DCI message 602 (e.g., current DCI format 3_0) may identify the leading granted sidelink resource block. The current DCI format 3_0 also includes a new data indicator (NDI) field. Thus, UE 115a may interpret the NDI field of DCI message 602 as the common NDI indicator for all three transport blocks. UE 115a can also be configured with an uplink control signal opportunity (e.g., PUCCH) resource to transmit acknowledgement information (e.g., Type 1 HARQ codebook) for each of the up to three transport blocks (or the number of transport blocks equal to the predetermined maximum number of grantable resources). This alternative aspect maximizes the throughput for sidelink communications, by increasing the number of transport blocks transmittable using the aggregated set of resources.

As illustrated, the first transport block (TB1) may be transmitted in the first granted sidelink resource slot (slot 1), and a retransmission of TB1 in the aggregated resource slot corresponding to the first granted sidelink resource slot. The second transport block (TB2) may be transmitted in the second granted sidelink resource slot (slot 2), and a retransmission of TB2 in the aggregated resource slot corresponding to the second granted sidelink resource slot. The third transport block (TB3) may be transmitted in the third granted sidelink resource slot (slot 3), and a retransmission of TB3 in the aggregated resource slot corresponding to the third granted sidelink resource slot.

It should be noted that in additional or alternative aspects, up to two NDI bits may be introduced into the DCI formats to allow for more flexible uses.

As another alternative transmission option to either the single transmission block transmission configuration or the maximum number of transmission block transmission configuration, UE 115a can be configured to interpret the sidelink transmission grant in DCI message 602 for transmission of up to R transport blocks, with up to two retransmission opportunities for each transport block carried over the bursts of the set of granted and aggregated sidelink resource slots following the second sidelink resource slot and that following the third sidelink resource slot specified by reservation field within DCI message 602. This alternative may also assist addressing half-duplex deafness. In operation, up to R transport blocks may be carried by up to R HARQ processes with incremental IDs, where indication of HARQ process ID included in DCI message 602 (e.g., current DCI format 3_0) may identify the leading granted sidelink resource block. As noted with the previous alternative, UE 115a may interpret the NDI field of DCI message 602 as the common NDI indicator for all three transport blocks, or an additional (R−1) bit for NDIs can be introduced for more flexible uses to address the transmissions and retransmissions of the up to R transport blocks.

UE 115a can also be configured with an uplink control signal opportunity (e.g., PUCCH) resource to transmit acknowledgement information (e.g., Type 1 HARQ codebook) for each of the up to R transport blocks. This alternative aspect may fall in between the maximum reliability and maximum throughput for sidelink communications experienced in the previously-described alternative aspects.

For purposes of describing the example up to R transport block transmission implementation, UE 115a is configured to transmit up to two transport blocks in the granted and aggregated sidelink resource slots configured with the sidelink transmission grant from DCI message 602 and the sidelink aggregation factor from RRC signaling 601. In operation, UE 115a may transmit the first transport block (TB1) in the first granted sidelink resource slot (slot 1), the second transport block (TB2) in the aggregated resource slot corresponding to slot 1. Any retransmission of TB1 may be transmitted in the second granted sidelink resource slot (slot 2) and third granted sidelink resource (slot 3), and any retransmission of TB2 may be transmitted in the aggregated resource slot corresponding to slot 2 and slot 3.

In additional transmission option, UE 115a may be configured with all of the individual transmission options, whether the single transport block option, the up to the predetermined maximum number of grantable resources transport block option, or the up to R transport block option, via higher layer signaling, such as RRC signaling 601. In a first example implementation, the transmission option configuration may include designation of a default option that will be used by UE 115a until an updated, lower level signal, such as through DCI message 602 or a medium access control control element (MAC-CE). In a second example implementation, the transmission option configuration configures UE 115a with the multiple options, in which any particular option is triggered via lower layer signaling, such as DCI message 602, a MAC-CE, or the like.

Figure 9:
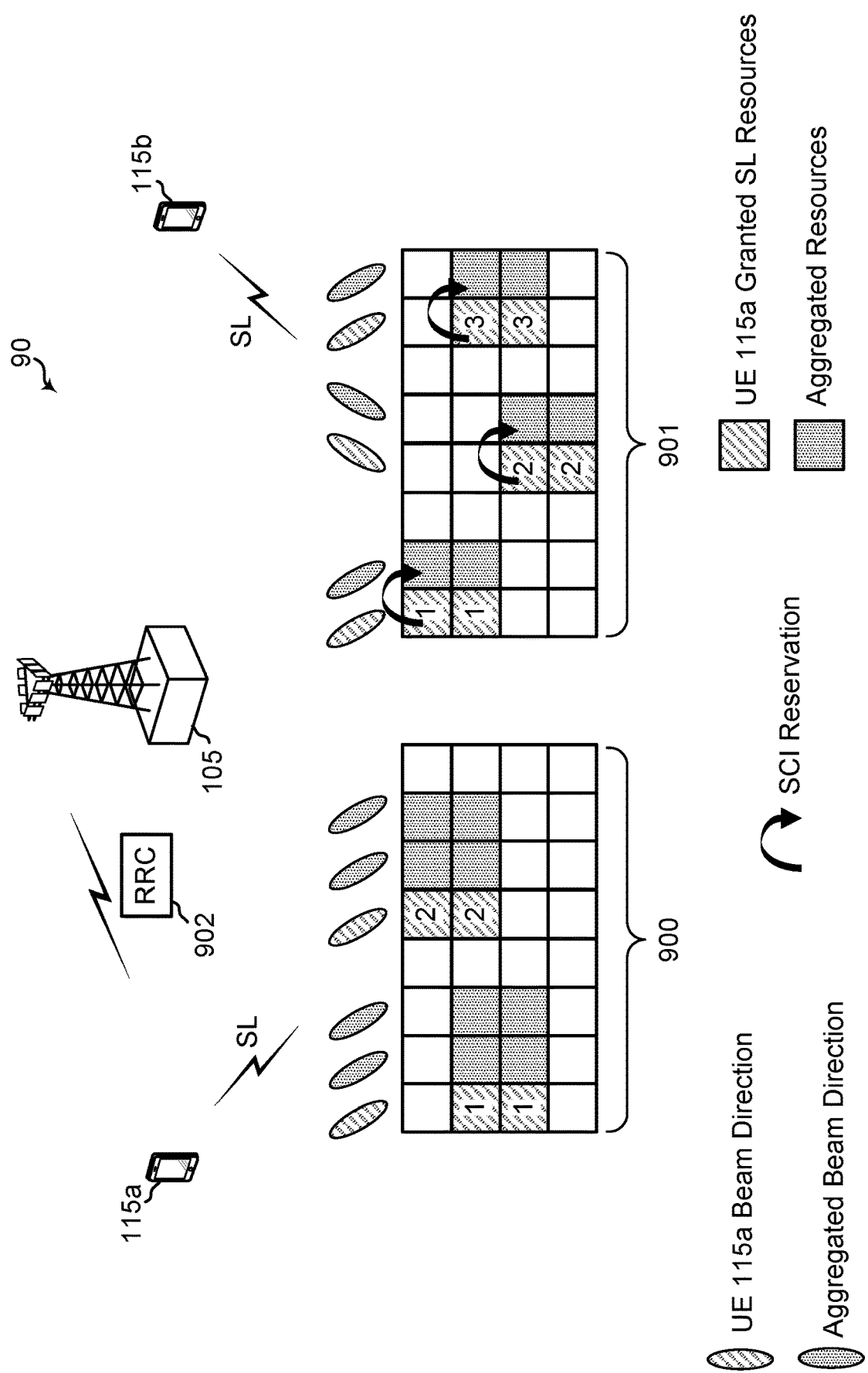
FIG. 9 is a block diagram illustrating a wireless network configured for Mode 1 NR SL operations with UEs served by a base station communicating in a mmW band and that supports sidelink transmission resource aggregation for in-coverage NR SL operations according to one or more aspects.

FIG. 9 is a block diagram illustrating a wireless network 90 configured for Mode 1 NR SL operations with UEs 115a and 115b served by base station 105 communicating in a mmW band and that supports sidelink transmission resource aggregation for in-coverage NR SL operations according to one or more aspects. Base station 105 configures UE 115a via RRC signaling 902 with transmission resource pools 900 and 901 available for sidelink communications by UE 115a with, for example, UE 115b. UE 115a, operating in Mode 1, may also receive a sidelink aggregation factor (denoted as R) via RRC signaling 902. When UE 115a receives a sidelink transmission grant in a DCI message (not shown), UE 115a interprets the grant to include aggregated resource slots, according to the sidelink aggregation factor, and the granted sidelink resource slots. By operating within a mmW band, UE 115a will perform beam management for the sidelink transmissions on the granted sidelink resource slots and the aggregated resource slots. The granted sidelink resource slots may have spatial relationship information, via a transmission configuration index (TCI), included in the DCI with the sidelink transmission grant. However, there may not be a corresponding TCI or spatial relationship information for the aggregated resource slots.

UE 115a may be configured to use the same TCI or spatial relation on an aggregated resource as is defined for the corresponding granted sidelink resource slot granted in the sidelink transmission grant of the DCI. As illustrated, UE 115a is granted a first granted two-sub-channel sidelink resource slot, slot 1, and a second granted two-sub-channel sidelink resource slot, slot 2, in transmission resource pool 900. The DCI includes the same TCI for each of slots 1 and 2. According to the illustrated aspect, UE 115a will further interpret the grant to use the same TCI for transmission of the aggregated sidelink resource slots associated with slots 1 and 2.

In transmission resource pool 901, UE 115a may coexist with different Mode 2 devices. In this scenario, UE 115a will include transmission of a sidelink control information (SCI) message for each of the granted sidelink resource slots, slots 1-3. The SCI messages will identify reservation of the resources with the same TCI or spatial relation between the granted slot and the aggregated slots.

Figure 10:
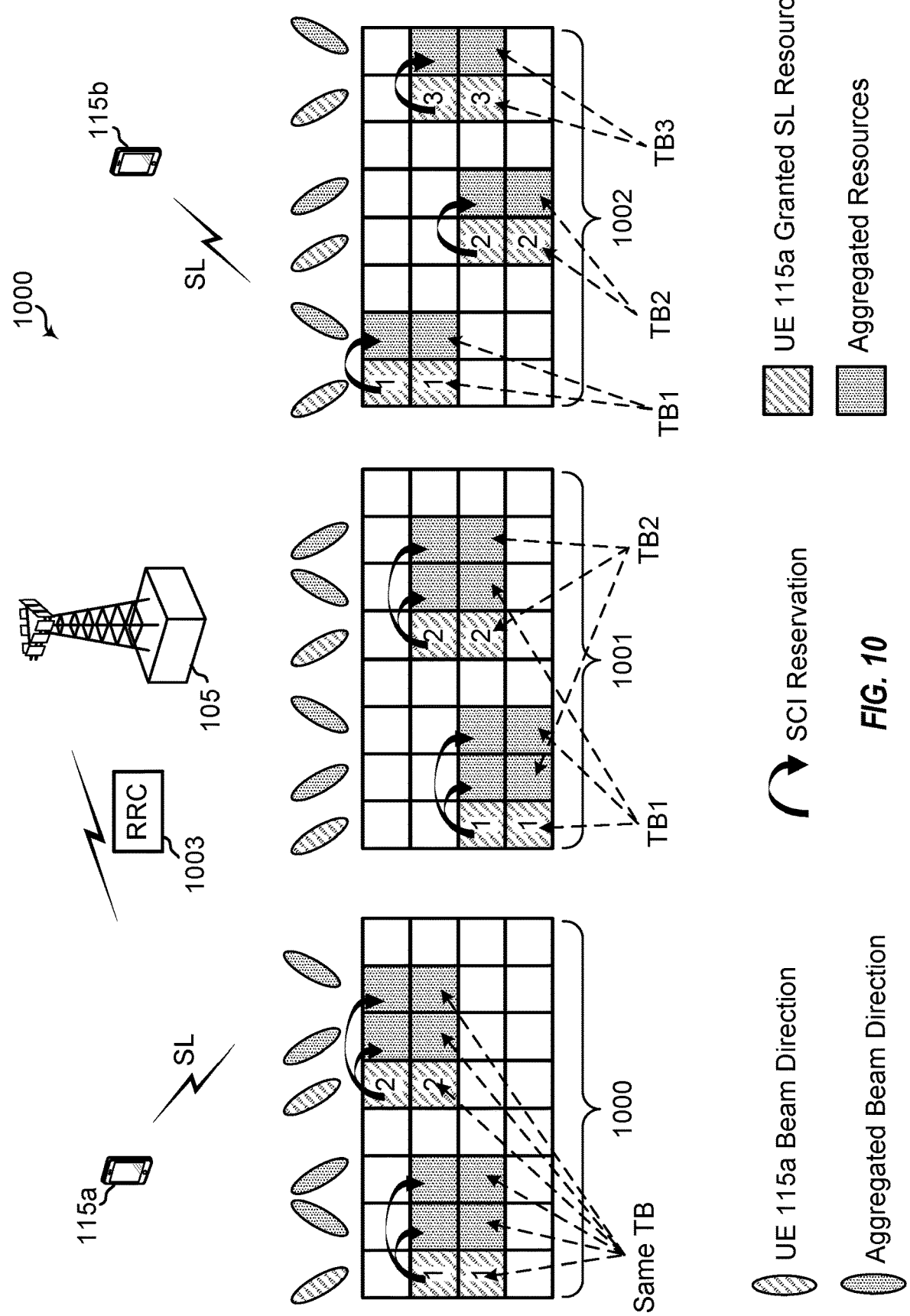
FIG. 10 is a block diagram illustrating a wireless network configured for Mode 1 NR SL operations with UEs served by a base station communicating in a mmW band and that supports sidelink transmission resource aggregation for in-coverage NR SL operations according to one or more aspects.

FIG. 10 is a block diagram illustrating a wireless network 1000 configured for Mode 1 NR SL operations with UEs 115a and 115b served by base station 105 communicating in a mmW band and that supports sidelink transmission resource aggregation for in-coverage NR SL operations according to one or more aspects. Base station 105 configures UE 115a via RRC signaling 1003 with transmission resource pools 1000-1002 available for sidelink communications by UE 115a with, for example, UE 115b. UE 115a, operating in Mode 1, may also receive a sidelink aggregation factor (denoted as R) via RRC signaling 1003. When UE 115a receives a sidelink transmission grant in a DCI message (not shown), UE 115a interprets the grant to include aggregated resource slots, according to the sidelink aggregation factor, and the granted sidelink resource slots.

UE 115a can be further configured in RRC signaling 1003 with a TCI sequence to apply respective TCIs over the aggregated sidelink resources. UE 115a may transmit SCI messages in each of the granted sidelink transmission resources that reserves the resources and identifies the TCI or spatial relation of beams for transmission in the granted slots and aggregated slots. In a first example implementation, UE 115a may sequentially step through the TCI sequence for each of the aggregated sidelink resource slots independently from the TCI applied to the granted sidelink resource slots, such as slots 1-2 in transmission resource pool 1000, slots 1-3 in transmission resource pool 1001, and slots 1-2 in transmission resource pool 1002. The TCI for the granted sidelink resource slots is provided, as previously indicated, in the DCI holding the sidelink transmission grants for transmission resource pools 1000-1002.

In another example implementation, UE 115a may be further configured with a function for identifying a TCI in the TCI sequence to apply to the aggregated sidelink resource slots. In one example of such a function, the length of the TCI sequence may be represented as, T. In the r-th aggregated sidelink resource slot, UE 115a can use the TCI in the sequence according to the following equation:

$$(r+t_0) \bmod T\text{-th TCI of the sequence.} \qquad (1)$$

The default value of $t_0$ may be zero, while a non-zero value of $t_0$ can be obtained from DCI.

UE 115a may be configured with different transmission options for each of transmission resource pools 1000-1003.

UE 115*a* is configured for transmission of a single transport block across the set of granted and aggregated sidelink resource slots of transmission resource pool 1000. UE 115*a* may be configured for transmission of up to R transport blocks, that is less than a predefined maximum number of grantable resources, in transmission resource pool 1001, and UE 115*a* may be configured for transmission of a number of transport blocks equal to the predefined maximum number of grantable resource in transmission resource pool 1002. The transmissions of the single transport block in transmission resource pool 1000 occurs in the first granted sidelink resource slot, while the remaining granted sidelink resource slots and aggregated resource slots are used for retransmission of the transmission block. Each of the multiple transport blocks in transmission resource pool 1001 may be transmitted in the first sequential sidelink slots beginning with the first granted sidelink resource slot, while the retransmission of any of such transport blocks may occur in the subsequent sidelink resource slots. Each of the multiple transport blocks in transmission resource pool 1002 may be transmitted in the granted sidelink resource slots, while the retransmissions for the transport blocks may occur in the corresponding aggregated sidelink resource slots.

Figure 11:
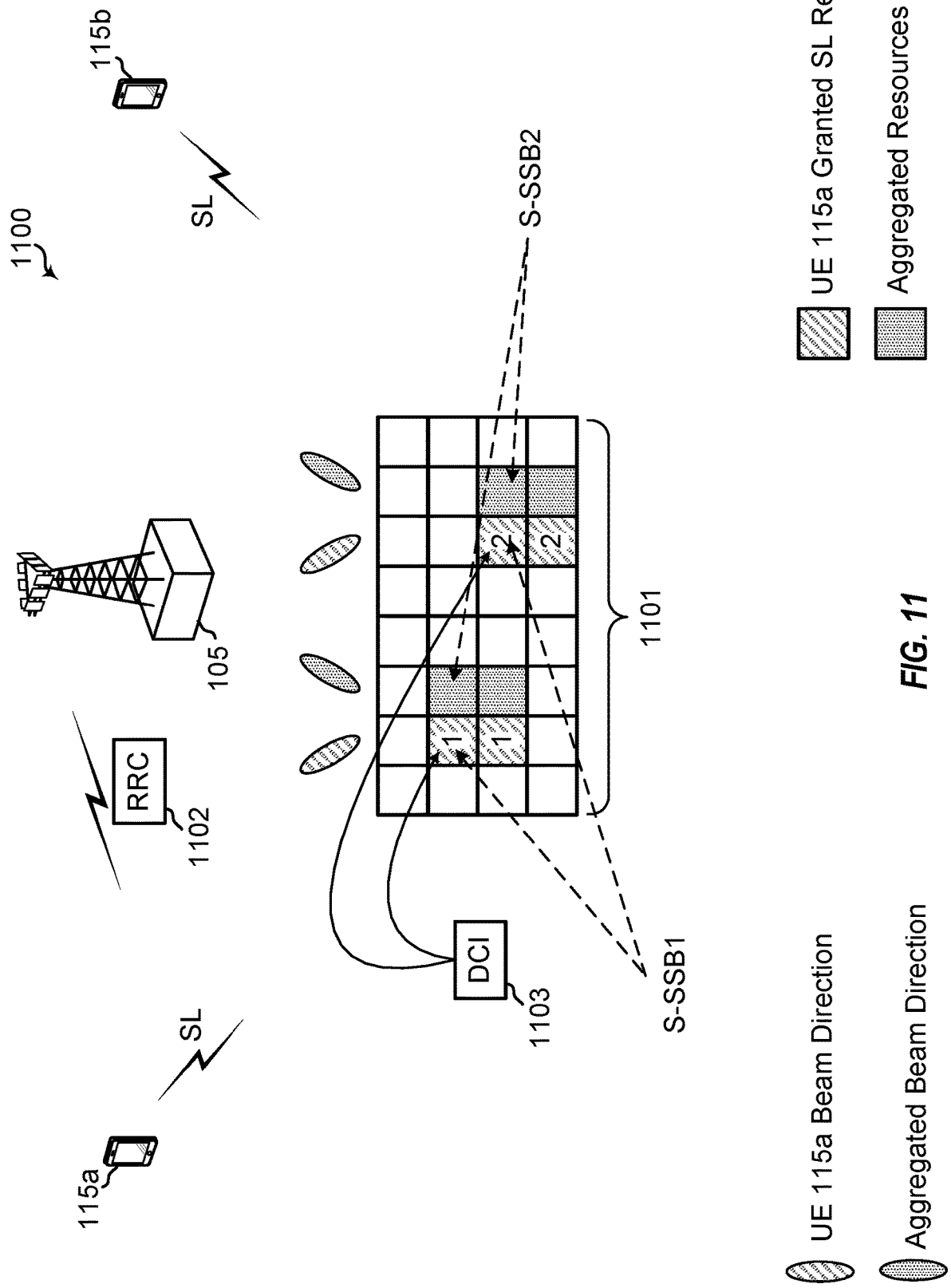
FIG. 11 is a block diagram illustrating a wireless network configured for Mode 1 NR SL operations with UEs served by a base station communicating in a mmW band and that supports sidelink transmission resource aggregation for in-coverage NR SL operations according to one or more aspects.

FIG. 11 is a block diagram illustrating a wireless network 1100 configured for Mode 1 NR SL operations with UEs 115*a* and 115*b* served by base station 105 communicating in a mmW band and that supports sidelink transmission resource aggregation for in-coverage NR SL operations according to one or more aspects. Base station 105 configures UE 115*a* via RRC signaling 1102 with transmission resource pool 1101 available for sidelink communications by UE 115*a* with, for example, UE 115*b*. UE 115*a*, operating in Mode 1, may also receive a sidelink aggregation factor (denoted as R) via RRC signaling 1102. When UE 115*a* receives a sidelink transmission grant in DCI message 1103, UE 115*a* interprets the grant to include aggregated resource slots, according to the sidelink aggregation factor, and the granted sidelink resource slots. For operations in the mmW bands, the sidelink resource aggregation according to the various aspects of the present disclosure are useful for conducting beamforming alignment, which involves transmission of a burst of beam-sweeping signals. Legacy DCI formats have limited capacity for granting a beam-sweeping burst.

According to the illustrated aspect, UE 115*a* may interpret the sidelink transmission grant of DCI message 1103 along with the sidelink aggregation factor to grant a set of granted and aggregated resource slots. When the aggregated sidelink resource slots are contiguous to the granted sidelink resource slot, UE 115*a* may perform beam-sweeping transmission, which allows base station 105 to flexibly arrange P1 and P2 using dynamic grants for beamforming alignment between a pair of peer SL UEs in Mode 1, such as UEs 115*a* and 115*b*. Thus, UE 115*a* may transmit sidelink-synchronization signal block 1 (S-SSB1) in the granted sidelink resource slots and S-SSB2 in the aggregated sidelink resource slots for performing beam alignment with UE 115*b*.

It should be noted that, in additional or alternative aspects, base station 105 may use a specific aggregation factor communicated to UE 115*a* for beamforming alignment, TCI sequence, and grant options from those for data transmissions. UE 115*a* may further be configured with a separate set of parameters for beamforming alignment usage with the aggregated sidelink resources.

Figure 12A:
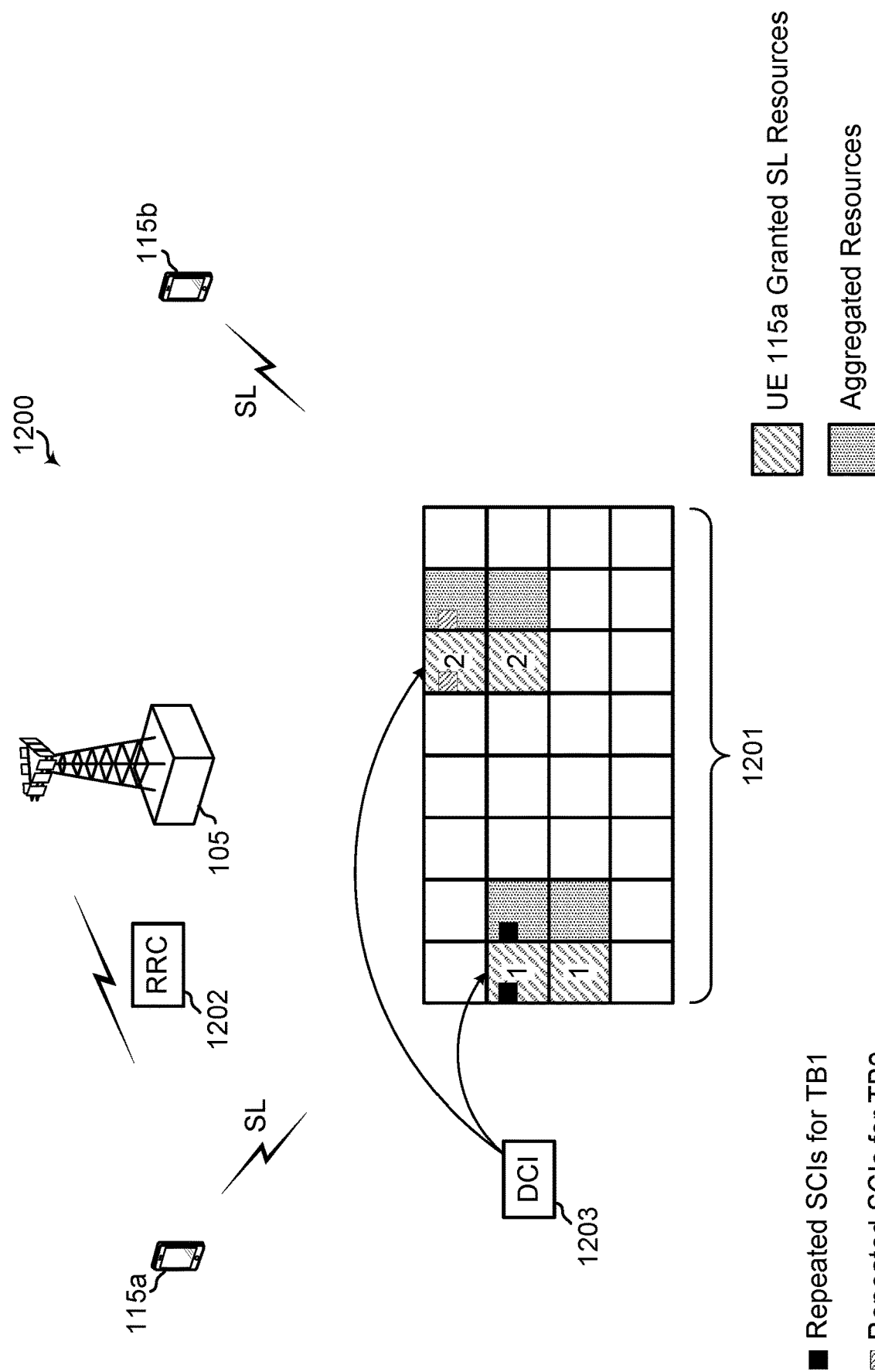
FIGS. 12A and 12B are block diagrams illustrating a wireless network configured for Mode 1 NR SL operations with UEs served by a base station communicating in a mmW band and that supports sidelink transmission resource aggregation for in-coverage NR SL operations according to one or more aspects.
Figure 12B:
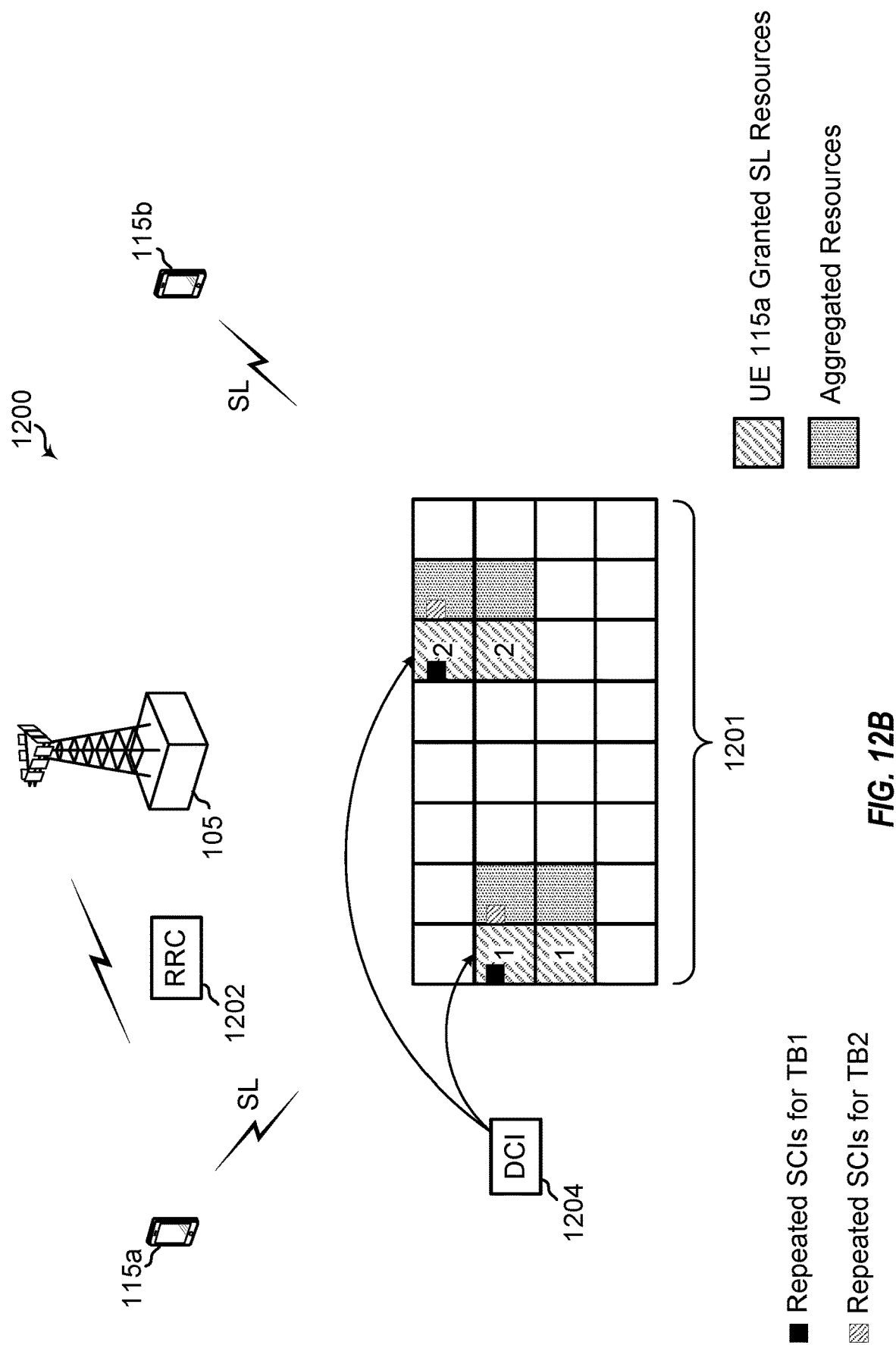

FIGS. 12A and 12B are block diagrams illustrating wireless network 1200 configured for Mode 1 NR SL operations with UEs 115*a* and 115*b* served by base station 105 communicating in a mmW band and that supports sidelink transmission resource aggregation for in-coverage NR SL operations according to one or more aspects. Base station 105 configures UE 115*a* via RRC signaling 1202 with transmission resource pool 1201 available for sidelink communications by UE 115*a* with, for example, UE 115*b*. UE 115*a*, operating in Mode 1, may also receive a sidelink aggregation factor (denoted as R) via RRC signaling 1202. UE 115*a* may further receive configuration of the different transmission options for single transport block or multiple transport blocks. When UE 115*a* receives a sidelink transmission grant in DCI message 1203 (FIG. 12A) or DCI message 1204 (FIG. 12B), UE 115*a* interprets the grant to include aggregated resource slots, according to the sidelink aggregation factor, and the granted sidelink resource slots, and determines whether one or multiple transport blocks will be transmitted over the granted and aggregated set of sidelink resource slots.

UE 115*a* may further be configured to transmit repeated SCI over the aggregated sidelink resource slots. When UE 115*a* is configured to transmit a single transport block, via DCI message 1203 (FIG. 12A), the repeated SCI can be related to the transmission and retransmission of the same transport block. In contrast, when UE 115*a* is configured to transmit multiple transport blocks, via DCI message 1204 (FIG. 12B), the repeated SCI can be related to the transmission and retransmission of the multiple transport blocks. In operation, the SCI in the first granted sidelink slot, as granted by DCI 1204 (FIG. 12B) relates to the transmission of the first transport block (TB1), and the SCI in the first aggregated sidelink resource slot relates to the transmission of the second transport block (TB2). The repeated SCIs in the second granted sidelink resource slot and the second aggregated sidelink resource slot relate to the retransmission of TB1 and TB2, respectively.

It is noted that one or more blocks (or operations) described with reference to FIG. 4 may be combined with one or more blocks (or operations) described with reference to another of the figures. For example, one or more blocks (or operations) of FIG. 5 may be combined with one or more blocks (or operations) of FIG. 8. As another example, one or more blocks associated with FIG. 6 may be combined with one or more blocks associated with FIG. 9. As another example, one or more blocks associated with FIG. 4 may be combined with one or more blocks (or operations) associated with FIGS. 1-2 and 5-12B. Additionally, or alternatively, one or more operations described above with reference to FIGS. 1-2 and 5-12B may be combined with one or more operations described with reference to FIG. 13.

In one or more aspects, techniques for supporting sidelink transmission resource aggregation for in-coverage NR SL operations may include additional aspects, such as any single aspect or any combination of aspects described below or in connection with one or more other processes or devices described elsewhere herein. One or more aspects supporting sidelink transmission resource aggregation for in-coverage NR SL operations may include an apparatus configured to obtaining a sidelink aggregation factor identifying a number of sidelink resource slots available to a UE to add to each sidelink resource slot allocated in a grant of sidelink channel access from a serving base station. The UE may then receive a sidelink transmission grant identifying at least one granted sidelink resource slot, and determine an aggregated set of sidelink resource slots for each granted sidelink resource slot. The UE may then transmit sidelink communications using the aggregated set of sidelink resource slots for each granted sidelink resource slots used for the sidelink communications. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

A first aspect of wireless communication performed by a UE includes obtaining, by the UE, a sidelink aggregation factor identifying a number of sidelink resource slots available to the UE to add to each sidelink resource slot allocated to the UE in a grant of sidelink channel access from a serving base station; receiving, by the UE, a sidelink transmission grant from the serving base station identifying at least one granted sidelink resource slot; determining, by the UE, an aggregated set of sidelink resource slots for each granted sidelink resource slot of the at least one granted sidelink resource slot, wherein the aggregated set of sidelink resource slots includes a plurality of sidelink resource slots equal to a granted sidelink resource slot of the at least one granted sidelink resource slot plus a number of additional sidelink resource slots up to the sidelink aggregation factor; and transmitting, by the UE, sidelink communications using the aggregated set of sidelink resource slots for each one or more granted sidelink resource slots of the at least one granted sidelink resource slots used by the UE for the sidelink communications.

In a second aspect, alone or in combination with the first aspect, wherein the aggregated set of sidelink resource slots includes one of: the number of additional slots contiguous to the granted sideline resource slot; or the number of additional slots non-contiguous to the granted sideline resource slot, wherein the number of additional slots are one of contiguous or non-contiguous to each other.

In a third aspect, alone or in combination with the first aspect or second aspect, wherein the sidelink aggregation factor is obtained from one of: RRC signaling, or DCI signaling.

In a fourth aspect, alone or in combination with one or more of the first aspect through the third aspect, wherein the determining the aggregated set of sidelink resources includes: identifying a number of interim slots between a first granted sidelink resource slot of the at least one granted sidelink resource slot and a next granted sidelink resource slot of the at least one granted sidelink resource slot; comparing the sidelink aggregation factor with the number of interim slots; setting the number of additional sidelink resource slots to the number of interim slots in response to the sidelink aggregation factor exceeding the number of interim slots; and setting the number of additional sidelink resource slots to the sidelink aggregation factor in response to the number of interim slots exceeding the sidelink aggregation factor.

In a fifth aspect, alone or in combination with one or more of the first aspect through the fourth aspect, wherein the determining the aggregated set of sidelink resources includes: identifying a number of interim slots between a first granted sidelink resource slot of the at least one granted sidelink resource slot and a predetermined threshold number of slots from a next granted sidelink resource slot of the at least one granted sidelink resource slot, wherein the UE receives the predetermined threshold number of slot from the serving base station; comparing the sidelink aggregation factor with the number of interim slots; setting the number of additional sidelink resource slots to the number of interim slots in response to the sidelink aggregation factor exceeding the number of interim slots; and setting the number of additional sidelink resource slots to the sidelink aggregation factor in response to the number of interim slots exceeding the sidelink aggregation factor.

In a sixth aspect, alone or in combination with one or more of the first aspect through the fifth aspect, further including: obtaining, by the UE from the serving base station, an aggregation indicator identifying sidelink resources to which the sidelink aggregation factor is applicable, wherein the aggregation indicator includes one of: an indicator identifying a transmission resource pool of one or more transmission resource pools allocated for sidelink transmissions by the serving base station; an indicator identifying a time and frequency window within an allocated transmission resource pool; an indicator identifying a set of destination UEs; and a dynamic indicator triggering application of the sidelink aggregation factor.

In a seventh aspect, alone or in combination with one or more of the first aspect through the sixth aspect, wherein the sidelink communications include one or more of: sidelink transmissions and sidelink retransmissions, and wherein the sidelink transmission grant includes a grant of the at least one granted sidelink resource slots up to a predetermined maximum allowed number of grantable resources and one or more transport blocks for the sidelink communications on the aggregated set of sidelink resource slots.

In an eighth aspect, alone or in combination with one or more of the first aspect through the seventh aspect, wherein the sidelink transmission grant is indicated to one of: one transport block; or a first plurality of transport blocks equal to the predetermined maximum allowed number of grantable resources; or a second plurality of transport blocks fewer than the predetermined maximum allowed number of grantable resources.

In a ninth aspect, alone or in combination with one or more of the first aspect through the eighth aspect, wherein the sidelink communications include one of: the sidelink transmissions of the one transport block using the granted sidelink resource slot and the sidelink retransmissions, in response to receipt of a negative acknowledgement of the sidelink transmissions, of the one transport block using the number of additional sidelink resource slots, or the sidelink transmissions of each of the first plurality of transport blocks using the granted sidelink resource slot of a corresponding granted slot of the at least one granted sidelink resource slots equal to the predetermined maximum allowed number of grantable resources and the sidelink retransmissions of associated transport blocks of the first plurality of transport blocks for which a negative acknowledgement is received using the number of additional sidelink resource slots associated with the granted sidelink resource slot of the corresponding granted slot, or the sidelink transmissions of the second plurality of transport blocks using the aggregated set of sidelink resource slots of first ones of the at least one granted sidelink resource slots fewer than the predetermined maximum allowed number of grantable resources and the sidelink retransmissions of associated transport blocks of the plurality of transport blocks for which a negative acknowledgement is received using the aggregated set of sidelink resource slots of next ones of the at least one granted sidelink resource slot after the first ones.

In a tenth aspect, alone or in combination with one or more of the first aspect through the ninth aspect, wherein the sidelink transmission grant further includes the grant of uplink control resources for request of additional retransmission resources for one of: the one transport block or one or more of the plurality of transport blocks.

In an eleventh aspect, alone or in combination with one or more of the first aspect through the tenth aspect, further including: receiving, by the UE, a transport block grant indication from the serving base station, wherein the transport block grant indication indicates that the sidelink transmission grant is for the one of: the one transport block, or the first plurality of transport blocks, or the second plurality of transport blocks.

In a twelfth aspect, alone or in combination with one or more of the first aspect through the eleventh aspect, further including: receiving, by the UE, a subsequent transport block grant indication from the serving base station, wherein the transport block grant indication identifies a default grant for the sidelink transmission grant of the one of the one transport block or the first plurality of transport blocks or the second plurality of transport blocks and the subsequent transport block grant indication identifies an updated default grant for the sidelink transmission grant of the one of the second plurality of transport blocks or the first plurality of transport blocks or the one transport block.

In a thirteenth aspect, alone or in combination with one or more of the first aspect through the twelfth aspect, wherein the determining the aggregated set of sidelink resource slots further includes: identifying a TCI configured for each granted sidelink resource slot; and applying the TCI of the granted sidelink resource slot to the number of additional sidelink resource slots.

In a fourteenth aspect, alone or in combination with one or more of the first aspect through the thirteenth aspect, wherein the identifying the TCI includes identifying the TCI in a SCI communicated within the granted sidelink resource slot.

In a fifteenth aspect, alone or in combination with one or more of the first aspect through the fourteenth aspect, further including: receiving, by the UE, a sequence of TCIs applicable to the number of additional sidelink resource slots, wherein the determining the aggregated set of sidelink resource slots includes configuring a TCI of the sequence of TCIs for each additional sidelink resource slot of the number of additional sidelink resource slots.

In a sixteenth aspect, alone or in combination with one or more of the first aspect through the fifteenth aspect, wherein the configuring the TCI includes one of: sequentially assigning each TCI of the sequence of TCIs for each additional sidelink resource slot of the number of additional sidelink resource slots, assigning each TCI of the sequence of TCIs according to predetermined formula, or assigning each TCI of the sequence of TCIs according to a predetermined formula and an assignment parameter received in a DCI message from the serving base station.

In a seventeenth aspect, alone or in combination with one or more of the first aspect through the sixteenth aspect, wherein the configuring the TCI includes identifying the TCI of the sequence of TCIs for the number of additional sidelink resource slots in a SCI communicated within the granted sidelink resource slot.

In an eighteenth aspect, alone or in combination with one or more of the first aspect through the seventeenth aspect, further including: transmitting, by the UE, beam-sweeping signals over a predetermined range of frequencies within the number of additional sidelink resource slots; and determining, by the UE, beamforming alignment with one or more peer UEs for the sidelink communications, wherein the beamforming alignment is determined using the beam-sweeping signals.

In a nineteenth aspect, alone or in combination with one or more of the first aspect through the eighteenth aspect, further including: receiving, by the UE, a sidelink configuration message that activates SCI repetition for the number of additional sidelink resource slots, wherein SCI repeated on the number of additional sidelink resource slots reserve resources for one of sidelink transmissions or sidelink retransmissions.

In a twentieth aspect, alone or in combination with one or more of the first aspect through the nineteenth aspect, wherein the SCI repeated on the number of additional sidelink resource slots reserves resources of the sidelink communications for one of: one transport block or a plurality of transport blocks A twenty-first aspect configured for wireless communication includes at least one processor; and a memory coupled to the at least one processor, wherein the at least one processor is configured: to obtain, by the UE, a sidelink aggregation factor identifying a number of sidelink resource slots available to the UE to add to each sidelink resource slot allocated to the UE in a grant of sidelink channel access from a serving base station; to receive, by the UE, a sidelink transmission grant from the serving base station identifying at least one granted sidelink resource slot; to determine, by the UE, an aggregated set of sidelink resource slots for each granted sidelink resource slot of the at least one granted sidelink resource slot, wherein the aggregated set of sidelink resource slots includes a plurality of sidelink resource slots equal to a granted sidelink resource slot of the at least one granted sidelink resource slot plus a number of additional sidelink resource slots up to the sidelink aggregation factor; and to transmit, by the UE, sidelink communications using the aggregated set of sidelink resource slots for each one or more granted sidelink resource slots of the at least one granted sidelink resource slots used by the UE for the sidelink communications.

In a twenty-second aspect, alone or in combination with the twentieth aspect, wherein the aggregated set of sidelink resource slots includes one of: the number of additional slots contiguous to the granted sideline resource slot; or the number of additional slots non-contiguous to the granted sideline resource slot, wherein the number of additional slots are one of contiguous or non-contiguous to each other.

In a twenty-third aspect, alone or in combination with one or more of the twentieth aspect or the twenty-second aspect, wherein the sidelink aggregation factor is obtained from one of: RRC signaling, or DCI signaling.

In a twenty-fourth aspect, alone or in combination with one or more of the twentieth aspect through the twenty-third aspect, wherein the configuration of the at least one processor to determine the aggregated set of sidelink resources includes configuration of the at least one processor: to identify a number of interim slots between a first granted sidelink resource slot of the at least one granted sidelink resource slot and a next granted sidelink resource slot of the at least one granted sidelink resource slot; to compare the sidelink aggregation factor with the number of interim slots; to set the number of additional sidelink resource slots to the number of interim slots in response to the sidelink aggregation factor exceeding the number of interim slots; and to set the number of additional sidelink resource slots to the sidelink aggregation factor in response to the number of interim slots exceeding the sidelink aggregation factor.

In a twenty-fifth aspect, alone or in combination with one or more of the twentieth aspect through the twenty-fourth aspect, wherein the configuration of the at least one processor to determine the aggregated set of sidelink resources includes configuration of the at least one processor: to identify a number of interim slots between a first granted sidelink resource slot of the at least one granted sidelink resource slot and a predetermined threshold number of slots from a next granted sidelink resource slot of the at least one granted sidelink resource slot, wherein the UE receives the predetermined threshold number of slot from the serving base station; to compare the sidelink aggregation factor with the number of interim slots; to set the number of additional sidelink resource slots to the number of interim slots in response to the sidelink aggregation factor exceeding the number of interim slots; and to set the number of additional sidelink resource slots to the sidelink aggregation factor in response to the number of interim slots exceeding the sidelink aggregation factor.

In a twenty-sixth aspect, alone or in combination with one or more of the twentieth aspect through the twenty-fifth aspect, further including configuration of the at least one processor: to obtain, by the UE from the serving base station, an aggregation indicator identifying sidelink resources to which the sidelink aggregation factor is applicable, wherein the aggregation indicator includes one of: an indicator identifying a transmission resource pool of one or more transmission resource pools allocated for sidelink transmissions by the serving base station; an indicator identifying a time and frequency window within an allocated transmission resource pool; an indicator identifying a set of destination UEs; and a dynamic indicator triggering application of the sidelink aggregation factor.

In a twenty-seventh aspect, alone or in combination with one or more of the twentieth aspect through the twenty-sixth aspect, wherein the sidelink communications include one or more of: sidelink transmissions and sidelink retransmissions, and wherein the sidelink transmission grant includes a grant of the at least one granted sidelink resource slots up to a predetermined maximum allowed number of grantable resources and one or more transport blocks for the sidelink communications on the aggregated set of sidelink resource slots.

In a twenty-eighth aspect, alone or in combination with one or more of the twentieth aspect through the twenty-seventh aspect, wherein the sidelink transmission grant is indicated to one of: one transport block; or a first plurality of transport blocks equal to the predetermined maximum allowed number of grantable resources; or a second plurality of transport blocks fewer than the predetermined maximum allowed number of grantable resources.

In a twenty-ninth aspect, alone or in combination with one or more of the twentieth aspect through the twenty-eighth aspect, wherein the sidelink communications include one of: the sidelink transmissions of the one transport block using the granted sidelink resource slot and the sidelink retransmissions, in response to receipt of a negative acknowledgement of the sidelink transmissions, of the one transport block using the number of additional sidelink resource slots, or the sidelink transmissions of each of the first plurality of transport blocks using the granted sidelink resource slot of a corresponding granted slot of the at least one granted sidelink resource slots equal to the predetermined maximum allowed number of grantable resources and the sidelink retransmissions of associated transport blocks of the first plurality of transport blocks for which a negative acknowledgement is received using the number of additional sidelink resource slots associated with the granted sidelink resource slot of the corresponding granted slot, or the sidelink transmissions of the second plurality of transport blocks using the aggregated set of sidelink resource slots of first ones of the at least one granted sidelink resource slots fewer than the predetermined maximum allowed number of grantable resources and the sidelink retransmissions of associated transport blocks of the plurality of transport blocks for which a negative acknowledgement is received using the aggregated set of sidelink resource slots of next ones of the at least one granted sidelink resource slot after the first ones.

In a thirtieth aspect, alone or in combination with one or more of the twentieth aspect through the twenty-ninth aspect, wherein the sidelink transmission grant further includes the grant of uplink control resources for request of additional retransmission resources for one of: the one transport block or one or more of the plurality of transport blocks.

In a thirty-first aspect, alone or in combination with one or more of the twentieth aspect through the thirtieth aspect, further including configuration of the at least one processor: to receive, by the UE, a transport block grant indication from the serving base station, wherein the transport block grant indication indicates that the sidelink transmission grant is for the one of: the one transport block, or the first plurality of transport blocks, or the second plurality of transport blocks.

In a thirty-second aspect, alone or in combination with one or more of the twentieth aspect through the thirty-first aspect, further including configuration of the at least one processor: to receive, by the UE, a subsequent transport block grant indication from the serving base station, wherein the transport block grant indication identifies a default grant for the sidelink transmission grant of the one of the one transport block or the first plurality of transport blocks or the second plurality of transport blocks and the subsequent transport block grant indication identifies an updated default grant for the sidelink transmission grant of the one of the second plurality of transport blocks or the first plurality of transport blocks or the one transport block.

In a thirty-third aspect, alone or in combination with one or more of the twentieth aspect through the thirty-second aspect, wherein the configuration of the at least one processor to determine the aggregated set of sidelink resource slots further includes configuration of the at least one processor: to identify a TCI configured for each granted sidelink resource slot; and to apply the TCI of the granted sidelink resource slot to the number of additional sidelink resource slots.

In a thirty-fourth aspect, alone or in combination with one or more of the twentieth aspect through the thirty-third aspect, wherein the configuration of the at least one processor to identify the TCI includes configuration of the at least one processor to identify the TCI in a SCI communicated within the granted sidelink resource slot.

In a thirty-fifth aspect, alone or in combination with one or more of the twentieth aspect through the thirty-fourth aspect, further including configuration of the at least one processor: to receive, by the UE, a sequence of TCIs applicable to the number of additional sidelink resource slots, wherein the configuration of the at least one processor to determine the aggregated set of sidelink resource slots includes configuration of the at least one processor to configure a TCI of the sequence of TCIs for each additional sidelink resource slot of the number of additional sidelink resource slots.

In a thirty-sixth aspect, alone or in combination with one or more of the twentieth aspect through the thirty-fifth aspect, wherein the configuration of the at least one processor to configure the TCI includes configuration of the at least one processor to one of: sequentially assign each TCI of the sequence of TCIs for each additional sidelink resource slot of the number of additional sidelink resource slots, assign each TCI of the sequence of TCIs according to predetermined formula, or assign each TCI of the sequence of TCIs according to a predetermined formula and an assignment parameter received in a DCI message from the serving base station.

In a thirty-seventh aspect, alone or in combination with one or more of the twentieth aspect through the thirty-sixth aspect, wherein the configuration of the at least one processor to configure the TCI includes configuration of the at least one processor to identify the TCI of the sequence of TCIs for the number of additional sidelink resource slots in a SCI communicated within the granted sidelink resource slot.

In a thirty-eighth aspect, alone or in combination with one or more of the twentieth aspect through the thirty-seventh aspect, further including configuration of the at least one processor: to transmit, by the UE, beam-sweeping signals over a predetermined range of frequencies within the number of additional sidelink resource slots; and to determine, by the UE, beamforming alignment with one or more peer UEs for the sidelink communications, wherein the beamforming alignment is determined using the beam-sweeping signals.

In a thirty-ninth aspect, alone or in combination with one or more of the twentieth aspect through the thirty-eighth aspect, further including configuration of the at least one processor: to receive, by the UE, a sidelink configuration message that activates SCI repetition for the number of additional sidelink resource slots, wherein SCI repeated on the number of additional sidelink resource slots reserve resources for one of sidelink transmissions or sidelink retransmissions.

In a fortieth aspect, alone or in combination with one or more of the twentieth aspect through the thirty-ninth aspect, wherein the SCI repeated on the number of additional sidelink resource slots reserves resources of the sidelink communications for one of: one transport block or a plurality of transport blocks A forty-first aspect configured for wireless communication includes means for obtaining, by the UE, a sidelink aggregation factor identifying a number of sidelink resource slots available to the UE to add to each sidelink resource slot allocated to the UE in a grant of sidelink channel access from a serving base station; means for receiving, by the UE, a sidelink transmission grant from the serving base station identifying at least one granted sidelink resource slot; means for determining, by the UE, an aggregated set of sidelink resource slots for each granted sidelink resource slot of the at least one granted sidelink resource slot, wherein the aggregated set of sidelink resource slots includes a plurality of sidelink resource slots equal to a granted sidelink resource slot of the at least one granted sidelink resource slot plus a number of additional sidelink resource slots up to the sidelink aggregation factor; and means for transmitting, by the UE, sidelink communications using the aggregated set of sidelink resource slots for each one or more granted sidelink resource slots of the at least one granted sidelink resource slots used by the UE for the sidelink communications.

In a forty-second aspect, alone or in combination with the forty-first aspect, wherein the aggregated set of sidelink resource slots includes one of: the number of additional slots contiguous to the granted sideline resource slot; or the number of additional slots non-contiguous to the granted sideline resource slot, wherein the number of additional slots are one of contiguous or non-contiguous to each other.

In a forty-third aspect, alone or in combination with one or more of the forty-first aspect or the forty-second aspect, wherein the sidelink aggregation factor is obtained from one of: RRC signaling, or DCI signaling.

In a forty-fourth aspect, alone or in combination with one or more of the forty-first aspect through the forty-third aspect, wherein the means for determining the aggregated set of sidelink resources includes: means for identifying a number of interim slots between a first granted sidelink resource slot of the at least one granted sidelink resource slot and a next granted sidelink resource slot of the at least one granted sidelink resource slot; means for comparing the sidelink aggregation factor with the number of interim slots; means for setting the number of additional sidelink resource slots to the number of interim slots in response to the sidelink aggregation factor exceeding the number of interim slots; and means for setting the number of additional sidelink resource slots to the sidelink aggregation factor in response to the number of interim slots exceeding the sidelink aggregation factor.

In a forty-fifth aspect, alone or in combination with one or more of the forty-first aspect through the forty-fourth aspect, wherein the means for determining the aggregated set of sidelink resources includes: means for identifying a number of interim slots between a first granted sidelink resource slot of the at least one granted sidelink resource slot and a predetermined threshold number of slots from a next granted sidelink resource slot of the at least one granted sidelink resource slot, wherein the UE receives the predetermined threshold number of slot from the serving base station; means for comparing the sidelink aggregation factor with the number of interim slots; means for setting the number of additional sidelink resource slots to the number of interim slots in response to the sidelink aggregation factor exceeding the number of interim slots; and means for setting the number of additional sidelink resource slots to the sidelink aggregation factor in response to the number of interim slots exceeding the sidelink aggregation factor.

In a forty-sixth aspect, alone or in combination with one or more of the forty-first aspect through the forty-fifth aspect, further including: means for obtaining, by the UE from the serving base station, an aggregation indicator identifying sidelink resources to which the sidelink aggregation factor is applicable, wherein the aggregation indicator includes one of: an indicator identifying a transmission resource pool of one or more transmission resource pools allocated for sidelink transmissions by the serving base station; an indicator identifying a time and frequency window within an allocated transmission resource pool; an indicator identifying a set of destination UEs; and a dynamic indicator triggering application of the sidelink aggregation factor.

In a forty-seventh aspect, alone or in combination with one or more of the forty-first aspect through the forty-sixth aspect, wherein the sidelink communications include one or more of: sidelink transmissions and sidelink retransmissions, and wherein the sidelink transmission grant includes a grant of the at least one granted sidelink resource slots up to a predetermined maximum allowed number of grantable resources and one or more transport blocks for the sidelink communications on the aggregated set of sidelink resource slots.

In a forty-eighth aspect, alone or in combination with one or more of the forty-first aspect through the forty-seventh aspect, wherein the sidelink transmission grant is indicated to one of: one transport block; or a first plurality of transport blocks equal to the predetermined maximum allowed number of grantable resources; or a second plurality of transport blocks fewer than the predetermined maximum allowed number of grantable resources.

In a forty-ninth aspect, alone or in combination with one or more of the forty-first aspect through the forty-eighth aspect, wherein the sidelink communications include one of: the sidelink transmissions of the one transport block using the granted sidelink resource slot and the sidelink retransmissions, in response to receipt of a negative acknowledgement of the sidelink transmissions, of the one transport block using the number of additional sidelink resource slots, or the sidelink transmissions of each of the first plurality of transport blocks using the granted sidelink resource slot of a corresponding granted slot of the at least one granted sidelink resource slots equal to the predetermined maximum allowed number of grantable resources and the sidelink retransmissions of associated transport blocks of the first plurality of transport blocks for which a negative acknowledgement is received using the number of additional sidelink resource slots associated with the granted sidelink resource slot of the corresponding granted slot, or the sidelink transmissions of the second plurality of transport blocks using the aggregated set of sidelink resource slots of first ones of the at least one granted sidelink resource slots fewer than the predetermined maximum allowed number of grantable resources and the sidelink retransmissions of associated transport blocks of the plurality of transport blocks for which a negative acknowledgement is received using the aggregated set of sidelink resource slots of next ones of the at least one granted sidelink resource slot after the first ones.

In a fiftieth aspect, alone or in combination with one or more of the forty-first aspect through the forty-ninth aspect, wherein the sidelink transmission grant further includes the grant of uplink control resources for request of additional retransmission resources for one of: the one transport block or one or more of the plurality of transport blocks.

In a fifty-first aspect, alone or in combination with one or more of the forty-first aspect through the fiftieth aspect, further including: means for receiving, by the UE, a transport block grant indication from the serving base station, wherein the transport block grant indication indicates that the sidelink transmission grant is for the one of: the one transport block, or the first plurality of transport blocks, or the second plurality of transport blocks.

In a fifty-second aspect, alone or in combination with one or more of the forty-first aspect through the fifty-first aspect, further including: means for receiving, by the UE, a subsequent transport block grant indication from the serving base station, wherein the transport block grant indication identifies a default grant for the sidelink transmission grant of the one of the one transport block or the first plurality of transport blocks or the second plurality of transport blocks and the subsequent transport block grant indication identifies an updated default grant for the sidelink transmission grant of the one of the second plurality of transport blocks or the first plurality of transport blocks or the one transport block.

In a fifty-third aspect, alone or in combination with one or more of the forty-first aspect through the fifty-second aspect, wherein the means for determining the aggregated set of sidelink resource slots further includes: means for identifying a TCI configured for each granted sidelink resource slot; and means for applying the TCI of the granted sidelink resource slot to the number of additional sidelink resource slots.

In a fifty-fourth aspect, alone or in combination with one or more of the forty-first aspect through the fifty-third aspect, wherein the means for identifying the TCI includes means for identifying the TCI in a SCI communicated within the granted sidelink resource slot.

In a fifty-fifth aspect, alone or in combination with one or more of the forty-first aspect through the fifty-fourth aspect, further including: means for receiving, by the UE, a sequence of TCIs applicable to the number of additional sidelink resource slots, wherein the means for determining the aggregated set of sidelink resource slots includes means for configuring a TCI of the sequence of TCIs for each additional sidelink resource slot of the number of additional sidelink resource slots.

In a fifty-sixth aspect, alone or in combination with one or more of the forty-first aspect through the fifty-fifth aspect, wherein the means for configuring the TCI includes one of: means for sequentially assigning each TCI of the sequence of TCIs for each additional sidelink resource slot of the number of additional sidelink resource slots, means for assigning each TCI of the sequence of TCIs according to predetermined formula, or means for assigning each TCI of the sequence of TCIs according to a predetermined formula and an assignment parameter received in a DCI message from the serving base station.

In a fifty-seventh aspect, alone or in combination with one or more of the forty-first aspect through the fifty-sixth aspect, wherein the means for configuring the TCI includes means for identifying the TCI of the sequence of TCIs for the number of additional sidelink resource slots in a SCI communicated within the granted sidelink resource slot.

In a fifty-eighth aspect, alone or in combination with one or more of the forty-first aspect through the fifty-seventh aspect, further including: means for transmitting, by the UE, beam-sweeping signals over a predetermined range of frequencies within the number of additional sidelink resource slots; and means for determining, by the UE, beamforming alignment with one or more peer UEs for the sidelink communications, wherein the beamforming alignment is determined using the beam-sweeping signals.

In a fifty-ninth aspect, alone or in combination with one or more of the forty-first aspect through the fifty-eighth aspect, further including: means for receiving, by the UE, a sidelink configuration message that activates SCI repetition for the number of additional sidelink resource slots, wherein SCI repeated on the number of additional sidelink resource slots reserve resources for one of sidelink transmissions or sidelink retransmissions.

In a sixtieth aspect, alone or in combination with one or more of the forty-first aspect through the fifty-ninth aspect, wherein the SCI repeated on the number of additional sidelink resource slots reserves resources of the sidelink communications for one of: one transport block or a plurality of transport blocks A sixty-first aspect includes a non-transitory computer-readable medium having program code recorded thereon, where the program code includes program code executable by a computer configured to cause the computer to obtain, by the UE, a sidelink aggregation factor identifying a number of sidelink resource slots available to the UE to add to each sidelink resource slot allocated to the UE in a grant of sidelink channel access from a serving base station; to receive, by the UE, a sidelink transmission grant from the serving base station identifying at least one granted sidelink resource slot; to determine, by the UE, an aggregated set of sidelink resource slots for each granted sidelink resource slot of the at least one granted sidelink resource slot, wherein the aggregated set of sidelink resource slots includes a plurality of sidelink resource slots equal to a granted sidelink resource slot of the at least one granted sidelink resource slot plus a number of additional sidelink resource slots up to the sidelink aggregation factor; and to transmit, by the UE, sidelink communications using the aggregated set of sidelink resource slots for each one or more granted sidelink resource slots of the at least one granted sidelink resource slots used by the UE for the sidelink communications.

In a sixty-second aspect, alone or in combination with the sixty-first aspect, wherein the aggregated set of sidelink resource slots includes one of: the number of additional slots contiguous to the granted sideline resource slot; or the number of additional slots non-contiguous to the granted sideline resource slot, wherein the number of additional slots are one of contiguous or non-contiguous to each other.

In a sixty-third aspect, alone or in combination with the sixty-first aspect or the sixty-second aspect, wherein the sidelink aggregation factor is obtained from one of: RRC signaling or DCI signaling.

In a sixty-fourth aspect, alone or in combination with the sixty-first aspect through the sixty-third aspect, wherein the configuration of the at least one processor to determine the aggregated set of sidelink resources includes configuration of the at least one processor: to identify a number of interim slots between a first granted sidelink resource slot of the at least one granted sidelink resource slot and a next granted sidelink resource slot of the at least one granted sidelink resource slot; to compare the sidelink aggregation factor with the number of interim slots; to set the number of additional sidelink resource slots to the number of interim slots in response to the sidelink aggregation factor exceeding the number of interim slots; and to set the number of additional sidelink resource slots to the sidelink aggregation factor in response to the number of interim slots exceeding the sidelink aggregation factor.

In a sixty-fifth aspect, alone or in combination with the sixty-first aspect through the sixty-fourth aspect, wherein the configuration of the at least one processor to determine the aggregated set of sidelink resources includes configuration of the at least one processor: to identify a number of interim slots between a first granted sidelink resource slot of the at least one granted sidelink resource slot and a predetermined threshold number of slots from a next granted sidelink resource slot of the at least one granted sidelink resource slot, wherein the UE receives the predetermined threshold number of slot from the serving base station; to compare the sidelink aggregation factor with the number of interim slots; to set the number of additional sidelink resource slots to the number of interim slots in response to the sidelink aggregation factor exceeding the number of interim slots; and to set the number of additional sidelink resource slots to the sidelink aggregation factor in response to the number of interim slots exceeding the sidelink aggregation factor.

In a sixty-sixth aspect, alone or in combination with the sixty-first aspect through the sixty-fifth aspect, further including configuration of the at least one processor: to obtain, by the UE from the serving base station, an aggregation indicator identifying sidelink resources to which the sidelink aggregation factor is applicable, wherein the aggregation indicator includes one of: an indicator identifying a transmission resource pool of one or more transmission resource pools allocated for sidelink transmissions by the serving base station; an indicator identifying a time and frequency window within an allocated transmission resource pool; an indicator identifying a set of destination UEs; and a dynamic indicator triggering application of the sidelink aggregation factor.

In a sixty-seventh aspect, alone or in combination with the sixty-first aspect through the sixty-sixth aspect, wherein the sidelink communications include one or more of: sidelink transmissions and sidelink retransmissions, and wherein the sidelink transmission grant includes a grant of the at least one granted sidelink resource slots up to a predetermined maximum allowed number of grantable resources and one or more transport blocks for the sidelink communications on the aggregated set of sidelink resource slots.

In a sixty-eighth aspect, alone or in combination with the sixty-first aspect through the sixty-seventh aspect, wherein the sidelink transmission grant is indicated to one of: one transport block; or a first plurality of transport blocks equal to the predetermined maximum allowed number of grantable resources; or a second plurality of transport blocks fewer than the predetermined maximum allowed number of grantable resources.

In a sixty-ninth aspect, alone or in combination with the sixty-first aspect through the sixty-eighth aspect, wherein the sidelink communications include one of: the sidelink transmissions of the one transport block using the granted sidelink resource slot and the sidelink retransmissions, in response to receipt of a negative acknowledgement of the sidelink transmissions, of the one transport block using the number of additional sidelink resource slots, or the sidelink transmissions of each of the first plurality of transport blocks using the granted sidelink resource slot of a corresponding granted slot of the at least one granted sidelink resource slots equal to the predetermined maximum allowed number of grantable resources and the sidelink retransmissions of associated transport blocks of the first plurality of transport blocks for which a negative acknowledgement is received using the number of additional sidelink resource slots associated with the granted sidelink resource slot of the corresponding granted slot, or the sidelink transmissions of the second plurality of transport blocks using the aggregated set of sidelink resource slots of first ones of the at least one granted sidelink resource slots fewer than the predetermined maximum allowed number of grantable resources and the sidelink retransmissions of associated transport blocks of the plurality of transport blocks for which a negative acknowledgement is received using the aggregated set of sidelink resource slots of next ones of the at least one granted sidelink resource slot after the first ones.

In a seventieth aspect, alone or in combination with the sixty-first aspect through the sixty-ninth aspect, wherein the sidelink transmission grant further includes the grant of uplink control resources for request of additional retransmission resources for one of: the one transport block or one or more of the plurality of transport blocks.

In a seventy-first aspect, alone or in combination with the sixty-first aspect through the seventieth aspect, further including configuration of the at least one processor: to receive, by the UE, a transport block grant indication from the serving base station, wherein the transport block grant indication indicates that the sidelink transmission grant is for the one of: the one transport block, or the first plurality of transport blocks, or the second plurality of transport blocks.

In a seventy-second aspect, alone or in combination with the sixty-first aspect through the seventy-first aspect, further including configuration of the at least one processor: to receive, by the UE, a subsequent transport block grant indication from the serving base station, wherein the transport block grant indication identifies a default grant for the sidelink transmission grant of the one of the one transport block or the first plurality of transport blocks or the second plurality of transport blocks and the subsequent transport block grant indication identifies an updated default grant for the sidelink transmission grant of the one of the second plurality of transport blocks or the first plurality of transport blocks or the one transport block.

In a seventy-third aspect, alone or in combination with the sixty-first aspect through the seventy-second aspect, wherein the configuration of the at least one processor to determine the aggregated set of sidelink resource slots further includes configuration of the at least one processor: to identify a TCI configured for each granted sidelink resource slot; and to apply the TCI of the granted sidelink resource slot to the number of additional sidelink resource slots.

In a seventy-fourth aspect, alone or in combination with the sixty-first aspect through the seventy-third aspect, wherein the configuration of the at least one processor to identify the TCI includes configuration of the at least one processor to identify the TCI in a SCI communicated within the granted sidelink resource slot.

In a seventy-fifth aspect, alone or in combination with the sixty-first aspect through the seventy-fourth aspect, further including configuration of the at least one processor: to receive, by the UE, a sequence of TCIs applicable to the number of additional sidelink resource slots, wherein the configuration of the at least one processor to determine the aggregated set of sidelink resource slots includes configuration of the at least one processor to configure a TCI of the sequence of TCIs for each additional sidelink resource slot of the number of additional sidelink resource slots.

In a seventy-sixth aspect, alone or in combination with the sixty-first aspect through the seventy-fifth aspect, wherein the configuration of the at least one processor to configure the TCI includes configuration of the at least one processor to one of: sequentially assign each TCI of the sequence of TCIs for each additional sidelink resource slot of the number of additional sidelink resource slots, assign each TCI of the sequence of TCIs according to predetermined formula, or assign each TCI of the sequence of TCIs according to a predetermined formula and an assignment parameter received in a DCI message from the serving base station.

In a seventy-seventh aspect, alone or in combination with the sixty-first aspect through the seventy-sixth aspect, wherein the configuration of the at least one processor to configure the TCI includes configuration of the at least one processor to identify the TCI of the sequence of TCIs for the number of additional sidelink resource slots in a SCI communicated within the granted sidelink resource slot.

In a seventy-eighth aspect, alone or in combination with the sixty-first aspect through the seventy-seventh aspect, further including configuration of the at least one processor: to transmit, by the UE, beam-sweeping signals over a predetermined range of frequencies within the number of additional sidelink resource slots; and to determine, by the UE, beamforming alignment with one or more peer UEs for the sidelink communications, wherein the beamforming alignment is determined using the beam-sweeping signals.

In a seventy-ninth aspect, alone or in combination with the sixty-first aspect through the seventy-eighth aspect, further including configuration of the at least one processor: to receive, by the UE, a sidelink configuration message that activates SCI repetition for the number of additional sidelink resource slots, wherein SCI repeated on the number of additional sidelink resource slots reserve resources for one of sidelink transmissions or sidelink retransmissions.

In an eightieth aspect, alone or in combination with the sixty-first aspect through the seventy-ninth aspect, wherein the SCI repeated on the number of additional sidelink resource slots reserves resources of the sidelink communications for one of: one transport block or a plurality of transport blocks.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   obtaining a sidelink aggregation factor identifying a number of sidelink resource slots available to add to each sidelink resource slot allocated in a grant of sidelink channel access from a serving base station;
   receiving a sidelink transmission grant from the serving base station identifying at least one granted sidelink resource slot;
   determining an aggregated set of sidelink resource slots for each granted sidelink resource slot of the at least one granted sidelink resource slot, wherein the aggregated set of sidelink resource slots includes a plurality of sidelink resource slots equal to a granted sidelink resource slot of the at least one granted sidelink resource slot plus a number of additional sidelink resource slots up to the sidelink aggregation factor; and
   transmitting sidelink communications using the aggregated set of sidelink resource slots for each one or more granted sidelink resource slots of the at least one granted sidelink resource slot for the sidelink communications.

2. The method of claim 1, wherein the aggregated set of sidelink resource slots includes one of:
   the number of additional sidelink resource slots contiguous to the granted sideline resource slot; or
   the number of additional sidelink resource slots non-contiguous to the granted sideline resource slot, wherein the number of additional sidelink resource slots are one of contiguous or non-contiguous to each other.

3. The method of claim 2, wherein the sidelink aggregation factor is obtained from one of:
   radio resource control (RRC) signaling, or
   downlink control information (DCI) signaling.

4. The method of claim 3, wherein the determining the aggregated set of sidelink resource slots includes:
   identifying a number of interim slots between a first granted sidelink resource slot of the at least one granted sidelink resource slot and a next granted sidelink resource slot of the at least one granted sidelink resource slot;
   comparing the sidelink aggregation factor with the number of interim slots;
   setting the number of additional sidelink resource slots to the number of interim slots in response to the sidelink aggregation factor exceeding the number of interim slots; and
   setting the number of additional sidelink resource slots to the sidelink aggregation factor in response to the number of interim slots exceeding the sidelink aggregation factor.

5. The method of claim 3, wherein the determining the aggregated set of sidelink resource slots includes:
   identifying a number of interim slots between a first granted sidelink resource slot of the at least one granted sidelink resource slot and a predetermined threshold number of slots from a next granted sidelink resource slot of the at least one granted sidelink resource slot, wherein the predetermined threshold number of slot are received from the serving base station;
   comparing the sidelink aggregation factor with the number of interim slots;
   setting the number of additional sidelink resource slots to the number of interim slots in response to the sidelink aggregation factor exceeding the number of interim slots; and
   setting the number of additional sidelink resource slots to the sidelink aggregation factor in response to the number of interim slots exceeding the sidelink aggregation factor.

6. The method of claim 3, further including:
   obtaining, by the UE from the serving base station, an aggregation indicator identifying sidelink resources to which the sidelink aggregation factor is applicable, wherein the aggregation indicator includes one of:
   an indicator identifying a transmission resource pool of one or more transmission resource pools allocated for sidelink transmissions by the serving base station;
   an indicator identifying a time and frequency window within an allocated transmission resource pool;
   an indicator identifying a set of destination UEs; and
   a dynamic indicator triggering application of the sidelink aggregation factor.

7. The method of claim 3,
   wherein the sidelink communications include one or more of: sidelink transmissions and sidelink retransmissions, and
   wherein the sidelink transmission grant includes a grant of the at least one granted sidelink resource slot up to a predetermined maximum allowed number of grantable resources and one or more transport blocks for the sidelink communications on the aggregated set of sidelink resource slots.

8. The method of claim 7, wherein the sidelink transmission grant is indicated to one of:
   one transport block;
   a first plurality of transport blocks equal to the predetermined maximum allowed number of grantable resources; or
   a second plurality of transport blocks fewer than the predetermined maximum allowed number of grantable resources.

9. The method of claim 8, wherein the sidelink communications include one of:
   the sidelink transmissions of the one transport block using the granted sidelink resource slot and the sidelink retransmissions, in response to receipt of a negative acknowledgement of the sidelink transmissions, of the one transport block using the number of additional sidelink resource slots,
   the sidelink transmissions of each of the first plurality of transport blocks using the granted sidelink resource slot of a corresponding granted slot of the at least one granted sidelink resource slots equal to the predetermined maximum allowed number of grantable resources and the sidelink retransmissions of associated transport blocks of the first plurality of transport blocks for which a negative acknowledgement is received using the number of additional sidelink resource slots associated with the granted sidelink resource slot of the corresponding granted slot, or
   the sidelink transmissions of the second plurality of transport blocks using the aggregated set of sidelink resource slots of first ones of the at least one granted sidelink resource slot fewer than the predetermined maximum allowed number of grantable resources and the sidelink retransmissions of associated transport blocks of the plurality of transport blocks for which a negative acknowledgement is received using the aggregated set of sidelink resource slots of next ones of the at least one granted sidelink resource slot after the first ones.

10. The method of claim 8, wherein the sidelink transmission grant further includes the grant of uplink control resources for request of additional retransmission resources for one of: the one transport block or one or more of one of: the first plurality of transport blocks or the second plurality of transport blocks.

11. The method of claim 8, further including:
receiving a transport block grant indication from the serving base station, wherein the transport block grant indication indicates that the sidelink transmission grant is for the one of: the one transport block, or the first plurality of transport blocks, or the second plurality of transport blocks.

12. The method of claim 11, further including:
receiving a subsequent transport block grant indication from the serving base station, wherein the transport block grant indication identifies a default grant for the sidelink transmission grant of the one of the one transport block or the first plurality of transport blocks or the second plurality of transport blocks and the subsequent transport block grant indication identifies an updated default grant for the sidelink transmission grant of the one of the second plurality of transport blocks or the first plurality of transport blocks or the one transport block.

13. The method of claim 3, wherein the determining the aggregated set of sidelink resource slots further includes:
identifying a transmission configuration index (TCI) configured for each granted sidelink resource slot; and
applying the TCI of the granted sidelink resource slot to the number of additional sidelink resource slots.

14. The method of claim 13, wherein the identifying the TCI includes identifying the TCI in a sidelink communication information (SCI) communicated within the granted sidelink resource slot.

15. The method of claim 3, further including:
receiving a sequence of transmission configuration indices (TCIs) applicable to the number of additional sidelink resource slots, wherein the determining the aggregated set of sidelink resource slots includes configuring a TCI of the sequence of TCIs for each additional sidelink resource slot of the number of additional sidelink resource slots.

16. The method of claim 15, wherein the configuring the TCI includes one of:
sequentially assigning each TCI of the sequence of TCIs for each additional sidelink resource slot of the number of additional sidelink resource slots,
assigning each TCI of the sequence of TCIs according to predetermined formula, or
assigning each TCI of the sequence of TCIs according to a predetermined formula and an assignment parameter received in a downlink control information (DCI) message from the serving base station.

17. The method of claim 15, wherein the configuring the TCI includes identifying the TCI of the sequence of TCIs for the number of additional sidelink resource slots in a sidelink communication information (SCI) communicated within the granted sidelink resource slot.

18. The method of claim 15, further including:
transmitting beam-sweeping signals over a predetermined range of frequencies within the number of additional sidelink resource slots; and
determining beamforming alignment with one or more peer UEs for the sidelink communications, wherein the beamforming alignment is determined using the beam-sweeping signals.

19. The method of claim 3, further including:
receiving a sidelink configuration message that activates sidelink communication information (SCI) repetition for the number of additional sidelink resource slots, wherein SCI messages repeated on the number of additional sidelink resource slots reserve resources for one of sidelink transmissions or sidelink retransmissions.

20. The method of claim 19, wherein the SCI repeated on the number of additional sidelink resource slots reserves resources of the sidelink communications for one of:
one transport block or a plurality of transport blocks.

21. An apparatus configured for wireless communication, the apparatus comprising:
at least one processor; and
at least one memory coupled to the at least one processor, wherein the at least one processor is individually or collectively configured:
to obtain a sidelink aggregation factor identifying a number of sidelink resource slots available to add to each sidelink resource slot allocated in a grant of sidelink channel access from a serving base station;
to receive a sidelink transmission grant from the serving base station identifying at least one granted sidelink resource slot;
to determine an aggregated set of sidelink resource slots for each granted sidelink resource slot of the at least one granted sidelink resource slot, wherein the aggregated set of sidelink resource slots includes a plurality of sidelink resource slots equal to a granted sidelink resource slot of the at least one granted sidelink resource slot plus a number of additional sidelink resource slots up to the sidelink aggregation factor; and
to transmit sidelink communications using the aggregated set of sidelink resource slots for each one or more granted sidelink resource slots of the at least one granted sidelink resource slots used for the sidelink communications.

22. The apparatus of claim 21, wherein the aggregated set of sidelink resource slots includes one of:
the number of additional sidelink resource slots contiguous to the granted sideline resource slot; or
the number of additional sidelink resource slots non-contiguous to the granted sideline resource slot, wherein the number of additional sidelink resource slots are one of contiguous or non-contiguous to each other; and
wherein the sidelink aggregation factor is obtained from one of:
radio resource control (RRC) signaling, or
downlink control information (DCI) signaling.

23. The apparatus of claim 22, wherein the configuration of the at least one processor individually or collectively to determine the aggregated set of sidelink resource slots includes configuration of the at least one processor individually or collectively:
to identify a number of interim slots between a first granted sidelink resource slot of the at least one granted sidelink resource slot and a next granted sidelink resource slot of the at least one granted sidelink resource slot;

to compare the sidelink aggregation factor with the number of interim slots;

to set the number of additional sidelink resource slots to the number of interim slots in response to the sidelink aggregation factor exceeding the number of interim slots; and to set the number of additional sidelink resource slots to the sidelink aggregation factor in response to the number of interim slots exceeding the sidelink aggregation factor.

24. The apparatus of claim 22, wherein the configuration of the at least one processor individually or collectively to determine the aggregated set of sidelink resource slots includes configuration of the at least one processor individually or collectively:

to identify a number of interim slots between a first granted sidelink resource slot of the at least one granted sidelink resource slot and a predetermined threshold number of slots from a next granted sidelink resource slot of the at least one granted sidelink resource slot, wherein the predetermined threshold number of slot are received from the serving base station;

to compare the sidelink aggregation factor with the number of interim slots;

to set the number of additional sidelink resource slots to the number of interim slots in response to the sidelink aggregation factor exceeding the number of interim slots; and to set the number of additional sidelink resource slots to the sidelink aggregation factor in response to the number of interim slots exceeding the sidelink aggregation factor.

25. The apparatus of claim 22, further including configuration of the at least one processor individually or collectively:

to obtain, from the serving base station, an aggregation indicator identifying sidelink resources to which the sidelink aggregation factor is applicable, wherein the aggregation indicator includes one of:

an indicator identifying a transmission resource pool of one or more transmission resource pools allocated for sidelink transmissions by the serving base station;

an indicator identifying a time and frequency window within an allocated transmission resource pool;

an indicator identifying a set of destination UEs; and a dynamic indicator triggering application of the sidelink aggregation factor.

26. The apparatus of claim 22, wherein the sidelink communications include one or more of: sidelink transmissions and sidelink retransmissions, and wherein the sidelink transmission grant includes a grant of the at least one granted sidelink resource slots up to a predetermined maximum allowed number of grantable resources and one or more transport blocks for the sidelink communications on the aggregated set of sidelink resource slots.

27. The apparatus of claim 26, wherein the sidelink transmission grant is indicated to one of:

one transport block;

a first plurality of transport blocks equal to the predetermined maximum allowed number of grantable resources; or a second plurality of transport blocks fewer than the predetermined maximum allowed number of grantable resources.

28. The apparatus of claim 27, wherein the sidelink communications include one of:

the sidelink transmissions of the one transport block using the granted sidelink resource slot and the sidelink retransmissions, in response to receipt of a negative acknowledgement of the sidelink transmissions, of the one transport block using the number of additional sidelink resource slots, the sidelink transmissions of each of the first plurality of transport blocks using the granted sidelink resource slot of a corresponding granted slot of the at least one granted sidelink resource slot equal to the predetermined maximum allowed number of grantable resources and the sidelink retransmissions of associated transport blocks of the first plurality of transport blocks for which a negative acknowledgement is received using the number of additional sidelink resource slots associated with the granted sidelink resource slot of the corresponding granted slot, or the sidelink transmissions of the second plurality of transport blocks using the aggregated set of sidelink resource slots of first ones of the at least one granted sidelink resource slot fewer than the predetermined maximum allowed number of grantable resources and the sidelink retransmissions of associated transport blocks of the plurality of transport blocks for which a negative acknowledgement is received using the aggregated set of sidelink resource slots of next ones of the at least one granted sidelink resource slot after the first ones.

29. The apparatus of claim 27, wherein the sidelink transmission grant further includes the grant of uplink control resources for request of additional retransmission resources for one of: the one transport block or one or more of one of the first plurality of transport blocks or the second plurality of transport blocks.

30. The apparatus of claim 22, further including configuration of the at least one processor individually or collectively:

to receive a sidelink configuration message that activates sidelink communication information (SCI) repetition for the number of additional sidelink resource slots, wherein SCI messages repeated on the number of additional sidelink resource slots reserve resources for one of sidelink transmissions or sidelink retransmissions.

* * * * *